(12) United States Patent
Pelletier et al.

(10) Patent No.: US 11,422,866 B2
(45) Date of Patent: *Aug. 23, 2022

(54) COMPUTER NETWORK OF COMPUTING RESOURCE INFRASTRUCTURES AND METHOD FOR ALLOCATING SAID RESOURCES TO CLIENT APPLICATIONS

(71) Applicant: BULL SAS, Les Clayes-sous-Bois (FR)

(72) Inventors: Benoit Pelletier, Saint Etienne de Crossey (FR); Loïc Albertin, Meylan (FR)

(73) Assignee: BULL SAS, Les Clayes-sous-Bois (FR)

( * ) Notice: Subject to any disclaimer, the term of this patent is extended or adjusted under 35 U.S.C. 154(b) by 117 days.

This patent is subject to a terminal disclaimer.

(21) Appl. No.: 16/958,289

(22) PCT Filed: Dec. 21, 2018

(86) PCT No.: PCT/FR2018/053536
§ 371 (c)(1),
(2) Date: Jul. 15, 2020

(87) PCT Pub. No.: WO2019/129987
PCT Pub. Date: Jul. 4, 2019

(65) Prior Publication Data
US 2021/0055974 A1    Feb. 25, 2021

(30) Foreign Application Priority Data
Dec. 27, 2017    (FR) .................................. 1763239

(51) Int. Cl.
*G06F 9/50*    (2006.01)
*G06F 8/60*    (2018.01)
*H04L 47/70*   (2022.01)

(52) U.S. Cl.
CPC .............. *G06F 9/5083* (2013.01); *G06F 8/60* (2013.01); *H04L 47/82* (2013.01)

(58) Field of Classification Search
CPC ........ G06F 8/60; G06F 9/5072; G06F 9/5083; H04L 47/82
See application file for complete search history.

(56) References Cited

U.S. PATENT DOCUMENTS 7,577,959 B2 *   8/2009   Nguyen .............. G06F 9/45558
                                                        718/1
10,908,967 B2 *  2/2021   Schmidt ................ G06F 9/5077
(Continued)

FOREIGN PATENT DOCUMENTS

WO        2014/057347 A2        4/2014

OTHER PUBLICATIONS

International Search Report of the International Searching Authority for PCT/FR2018/053536 dated Apr. 9, 2019.
(Continued)

*Primary Examiner* — Jorge A Chu Joy-Davila
(74) *Attorney, Agent, or Firm* — Meagher Emanuel Laks Goldberg & Liao, LLP

(57) ABSTRACT

The invention relates to a computer network comprising a group of multiple computing resource infrastructures (51 to 56) associated with multiple orchestrators (41 to 46), said orchestrators being responsible for allocating the resources of this infrastructure (51 to 56) to one or more additional components of an already-hosted client application (17) and being grouped together in a swarm in which they are interconnected by a cooperation interface (3). The allocation of resources is decided by a decision method based first on evaluations distributed to the orchestrators (41 to 46), then on a consensus protocol, between the orchestrators (41 to 46), which is based on the evaluations and which is implemented at the cooperation interface (3) in order to select one of the infrastructures (51 to 56) from the group to host the additional component(s) of the client application (17).

20 Claims, 14 Drawing Sheets

(56) References Cited

U.S. PATENT DOCUMENTS

| | | | |
|---|---|---|---|
| 2005/0228852 A1* | 10/2005 | Santos | G06F 9/5005 709/200 |
| 2006/0195715 A1* | 8/2006 | Herington | G06F 9/5077 714/4.2 |
| 2007/0180119 A1* | 8/2007 | Khivesara | H04L 47/828 709/226 |
| 2011/0016214 A1* | 1/2011 | Jackson | G06F 9/505 709/226 |
| 2013/0111033 A1 | 5/2013 | Mao et al. | |
| 2014/0101300 A1 | 4/2014 | Rosensweig et al. | |
| 2015/0237128 A1* | 8/2015 | Castro | H04L 67/125 709/203 |
| 2017/0201569 A1 | 7/2017 | Fu et al. | |

OTHER PUBLICATIONS

English translation of International Search Report of the International Searching Authority for PCT/FR2018/053536 dated Apr. 9, 2019.

\* cited by examiner

COMPUTER NETWORK OF COMPUTING RESOURCE INFRASTRUCTURES AND METHOD FOR ALLOCATING SAID RESOURCES TO CLIENT APPLICATIONS

FIELD OF THE INVENTION

The invention relates to the field of computer networks comprising a group of multiple computing resource infrastructures, and also to the field of decision methods for allocating computing resources, from one or the other of the computing resource infrastructures of the same group of infrastructures of a computer network, to all or part of a client application to host it.

CONTEXT OF THE INVENTION

A software application may depend, for its execution, on other basic software components, for example a Java execution support, an Oracle database, and also services and resources of infrastructures, for example a block level storage device, a load balancing system, an Ethernet network, central processing units (CPUs), storage memories.

A software application, also referred to as client application, can be distributed and spread out either over the same infrastructure, comprising different computing resources of a data center managed by the same resource manager, or over different infrastructures composed of heterogeneous hardware architectures across multiple locations. For example, one module of an application may run on a conventional data center infrastructure, while another module may run on an HPC supercomputer.

The deployment and provision of a distributed software application can be described in a complex process of workflow type. Similarly, the autonomous management of this distributed software application, including error recovery, load adaptation, updating of the application, can be described in stepwise processes.

Orchestrator type software aims to automate the running of these autonomous processes for provision or management of the applications. It will manage the interconnections between the modules of an application distributed over multiple resources of the same infrastructure or else over multiple resources belonging to different infrastructures.

The processes of managing an application are described explicitly either generically in the orchestrator, or in the form of metadata associated with the application.

In a hybrid infrastructure comprising a plurality of orchestrators, one orchestrator per infrastructure, the deployment of an application comprises steps of selecting the target orchestrator or the target infrastructure, before interaction with the chosen orchestrator. The selection process can be run by a human or automated by a system of rules. The steps of selecting the target orchestrator or the target infrastructure may be run in different types of systems.

Hereinafter, unless indicated otherwise, reference will be made indiscriminately to system or network.

According to a first prior art, a centralized system for the deployment of client applications on infrastructures of the same group in a computer network is known. The computer network can comprise one or more of these groups of computing resource infrastructures. The central node of this centralized system has the disadvantage of being both a bottleneck for the rate of deployment of the client applications and a single point of failure. Indeed, since all the communications relating to the deployment of the client applications pass through this central node, on the one hand the traffic will become quickly saturated at this level, and on the other hand a failure at this level blocks the deployment of all the client applications in all the infrastructures. Moreover, the expandability of the system requires reconfiguration of the rules of this central node. Examples of this first centralized prior art are "Apache Brooklyn" (registered trademark) or "Indigo" (registered trademark).

According to a second prior art, a decentralized system for the deployment of client applications on infrastructures of the same group in a computer network is known. The computer network can comprise one or more such groups of computing resource infrastructures. A decentralized system is the connection of multiple interconnected centralized sub-systems. The central node of each centralized sub-system has the disadvantage of being both a bottleneck for the rate of deployment of the client applications and a single point of failure. Indeed, since all the communications relating to the deployment of the client applications, being carried out at this centralized sub-system, pass through this central node, on the one hand the traffic will become quickly saturated at this level, and on the other hand a failure at this level blocks the deployment of all the client applications in all the infrastructures of this centralized sub-system, therefore actually blocks the deployment of some of the client applications in some of the infrastructures of this decentralized system.

According to a third prior art, a system is known that first distributes, in a predetermined manner, activities fixed on different computing resource infrastructures. Then, mobile activities are joined to the fixed activities on the basis of a placement algorithm running in parallel on each infrastructure without sharing the allocation result. Consequently, on the one hand the fixed activities are not allocated in an optimized manner based on the structure or the state of the infrastructures, and on the other hand the same mobile activity may be either unnecessarily duplicated on multiple infrastructures or, more critically, not hosted on any infrastructure.

SUMMARY OF THE INVENTION

The aim of the present invention is to provide a computer network and a decision method for allocating infrastructure computing resources from the group of this computer network that at least partially overcomes the above-mentioned disadvantages.

The invention proposes placing and distributing client applications on different infrastructures, by whole client application or only by application component, according to a distributed but synchronized intelligence.

The invention also proposes, after the first operation of initialization of a client application described in the previous paragraph, continuing, during a second operation for updating this client application, to place and distribute one or more additional components of one or more of the client applications on different infrastructures, only by additional application component, according to a distributed but synchronized intelligence, in order to retain the same advantages during the evolution of a client application as during the initialization thereof. The addition of an additional component of an already-deployed client application is carried out in a similar manner to the deployment of the other components carried out beforehand during the installation of this client application.

In fact, the invention proposes using a distributed computer network to avoid bottleneck(s) and single point(s) of failure, while synchronizing and harmonizing the resource allocation decision so that the latter is unified and consistent, thereby preventing in particular a client application being doubly hosted on two infrastructures or not being hosted on any infrastructure.

More particularly, the invention aims to provide a computer network of computing resource infrastructures and a decision method for allocating these resources, for which, on the one hand the evaluations are distributed to the respective orchestrators of these infrastructures, in order to avoid both bottleneck(s) and single point(s) of failure, and on the other hand the orchestrators are grouped together in a swarm and interconnected by a cooperation interface on which a consensus protocol decides on the allocation of the resources based on these evaluations, in order to guarantee both singleness and consistency of the resource allocation which has been decided.

To this end, the present invention proposes a computer network comprising a group of multiple computing resource infrastructures, among which: each infrastructure comprises multiple computing resources discrete from one another but managed by the same resource manager, each infrastructure is associated with an orchestrator which is responsible for allocating the resources of this infrastructure to one or more client applications, said orchestrators are grouped together in a swarm in which: said orchestrators are interconnected by a cooperation interface, the allocation of resources from one or the other of the infrastructures of the group, to a client application, to host all or part of this client application, is decided by a decision method based on: firstly evaluations of likelihoods of satisfying the requirements of this client application, respectively distributed to the orchestrators of this swarm, then, a consensus protocol, between the orchestrators of this swarm, which: is based on said evaluations, is implemented at the cooperation interface, selects one of the infrastructures of the group to host all or part of the client application.

To this end, the present invention also proposes a decision method for allocating computing resources, from one or the other of the computing resource infrastructures of the same group of infrastructures of a computer network, to all or part of a client application, to host it, based on: firstly, evaluations, distributed to the respective orchestrators of said infrastructures, of the likelihoods of satisfying the requirements of said client application, then, a consensus protocol between said orchestrators, which: is based on said evaluations, is implemented at a cooperation interface interconnecting said orchestrators of the same swarm associated with said group of infrastructures, selects one of said infrastructures of said group to host all or part of said client application, by allocating it all or part of the resources of the selected infrastructure.

To this end, the invention also proposes a computer network comprising a group of multiple computing resource infrastructures, among which: each infrastructure comprises multiple computing resources discrete from one another but managed by the same resource manager, each infrastructure is associated with an orchestrator which is responsible for allocating the resources of this infrastructure to one or more client applications, said orchestrators are grouped together in a swarm in which: said orchestrators are interconnected by a cooperation interface, the allocation of resources from one or the other of the infrastructures of the group, to an additional component of a client application already hosted by at least one of the infrastructures of said group following a first operation of initialization of this client application, to host said additional component of this client application during a second operation of updating this client application, is decided by a decision method based on: firstly, evaluations of likelihoods of satisfying the requirements of said additional component of this client application, respectively distributed to the orchestrators of this swarm, then, a consensus protocol between the orchestrators of the swarm, which: is based on said evaluations, is implemented at the cooperation interface, selects one of the infrastructures of the group to host said additional component of the client application.

To this end, the present invention further proposes a decision method for allocating computing resources, from one or the other of the computing resource infrastructures of the same group of infrastructures of a computer network, to an additional component of a client application already hosted by at least one of the infrastructures of said group following a first operation of initialization of this client application, to host said additional component of this client application during a second operation of updating this client application, based on: firstly evaluations, distributed to the respective orchestrators of said infrastructures, of the likelihoods of satisfying the requirements of said additional component of said client application, then, a consensus protocol between said orchestrators, which: is based on said evaluations, is implemented at a cooperation interface interconnecting said orchestrators of the same swarm associated with said group of infrastructures, selects one of said infrastructures of said group to host said additional component of said client application, by allocating it all or part of the resources of the selected infrastructure.

According to preferential embodiments of the invention, the deployment of client applications in a network of computing resource infrastructures is carried out by an intelligent swarm of orchestrators. Each orchestrator evaluates separately a hosting scenario for each client application and, for each client application, the best hosting scenario is selected by consensus between the orchestrators of the swarm. Next, the client applications are deployed in parallel on their respective infrastructures. Thus, this deployment is made both faster and more robust to local failures within the network.

According to preferential embodiments of the invention, the decision is distributed, and there is no central point and therefore no single point of failure. Moreover, the decision method is automated and does not require human intervention. The consensus protocol used ensures a high level of robustness and makes it possible to construct a consistent group with a reliable state shared between the different orchestrators. Moreover, without a single point of failure and without a bottleneck, the system enables better scaling up. Finally, the system makes it possible to dynamically adjoin new orchestrator instances, their available resources becoming automatically and immediately available, and also to aggregate heterogeneous resources for the deployment of an application.

According to preferential embodiments of the invention, the expandability of the system is facilitated, in so far as a new orchestrator supporting a new type of infrastructure only needs to communicate its capacities on its cooperation interface to its peers in order to be integrated into the swarm of orchestrators. Moreover, responsibility is distributed, which improves autonomy. Each orchestrator can even embed its own harmony score calculation logic, with the specificities of the type of infrastructure supported and its execution context, such as for example the location or the saturation level. Moreover, there are different possible channels of communication for the operator of a client application; in fact, one channel per orchestrator. Moreover, it enables the use of the whole bandwidth in terms of processing capacity by virtue of the aggregation of the capacities of each orchestrator. Finally, it is more resistant to failures, has better performance by virtue of the calculation distribution, and even makes it possible to have heterogeneity in the technology of the different infrastructures that make up the network or the system.

In preferred embodiments, the invention comprises one or more of the following features which may be used separately or in partial combination with one another or in full combination with one another, with one or the other of the aforementioned subjects of the invention.

Preferably, said additional component of this client application is a new component not yet hosted by one or the other of the infrastructures of said group.

Thus, bottlenecks and single points of failure continue to be avoided, while continuing to improve the consistency of the allocation of resources, even for a new component not yet deployed for an already installed client application.

Preferably, said additional component of this client application is the replication of an existing component already hosted by one or the other of the infrastructures of said group.

Thus, bottlenecks and single points of failure continue to be avoided, while continuing to improve the consistency of the allocation of resources, even for an already installed component but which it is necessary or beneficial to duplicate, at a given moment, either for loading reasons or for security reasons.

Preferably, in said group, only the orchestrators associated with infrastructures already hosting at least one component of this client application following said first operation of initialization of this client application, can participate in said decision method during said second operation of updating this client application.

This thus avoids excessively spreading out the distribution of the components of the same client application within infrastructures of the same group.

Preferably, said decision method comprises the following successive steps: a first step of requesting deployment of all or part of a client application from one of the orchestrators of the swarm, a second step of transmitting the requirements of all or part of said client application to all the orchestrators of the swarm, on their cooperation interface, a third step of notifying the participation or non-participation in the evaluations by the orchestrators of the swarm, on their cooperation interface, a fourth step of carrying out the evaluation by calculating a score for all or part of said client application by each of the orchestrators participating in the evaluations, a fifth step of agreeing, by the consensus protocol, on the selection of that one of the infrastructures of the group, for hosting all or part of said client application, which achieved the best score, a sixth step of deploying all or part of said application on the selected infrastructure.

Preferably, said decision method comprises the following successive steps: a first step of requesting deployment of said additional component of this client application from one of the orchestrators of the swarm, a second step of transmitting the requirements of all or part of said additional component of said client application to all the orchestrators of the swarm, on their cooperation interface, a third step of notifying the participation or non-participation in the evaluations by the orchestrators of the swarm, on their cooperation interface, a fourth step of carrying out the evaluation by calculating a score for said additional component of said client application by each of the orchestrators participating in the evaluations, a fifth step of agreeing, by the consensus protocol, on the selection of that one of the infrastructures of the group, for hosting said additional component of said client application, which achieved the best score, a sixth step of deploying said additional component of said application on the selected infrastructure.

Thus, the evaluations and the information used for these evaluations are distributed, while the results of these evaluations are synchronized and harmonized such that the final decision for allocation of resources of a selected infrastructure to a requesting client application is both unified and optimized in terms of harmony between the requesting application and the selected resource infrastructure.

Preferably, the whole client application is evaluated at once and is allocated to a single infrastructure.

Thus, the evaluation is simpler and quicker.

Preferably, each component of the client application is evaluated separately and is allocated to a single infrastructure, it being possible for two discrete components of the same client application to be allocated respectively to two different infrastructures of the group, one client application component being a unit for deploying this application on one of the infrastructures of the group, one component preferably being a physical machine or a virtual machine or a container.

Preferably, said additional component of the client application is allocated to a single infrastructure, said additional client application component being a unit for deployment of this application on one of the infrastructures of the group, one component preferably being a physical machine or a virtual machine or a container.

Thus, the evaluation is more optimized in terms of harmony between the requesting application and the selected resource infrastructure, since it is not only optimized client application by client application, but also client application component by client application component.

Preferably, said deployment step comprises the following phases: a first phase of launching multiple deployments of multiple discrete components of the same client application, implemented in parallel on multiple different infrastructures selected from the same group, a second phase of synchronizing said deployments with one another, during said deployments, a third phase of updating the relationships between the different components of this same client application hosted on the different infrastructures of this same group, a fourth phase of requesting a report of the deployments, by an operator of the client application, from one of the orchestrators of the swarm, a fifth phase of accessing the state of the deployments, via the cooperation interface, by this orchestrator, a sixth phase of sending a report of the state of the deployments, by this orchestrator, to the operator of the client application.

Preferably, said deployment step comprises the following phases: a first phase of launching the deployment of said additional component, after the deployments of multiple discrete components of the same client application, implemented beforehand in parallel on multiple different infrastructures selected from the same group, a second phase of updating the relationships between the different components of this same client application hosted on the different infrastructures of this same group, including said additional component, a third phase of requesting a report of the deployments, by an operator of the client application, from one of the orchestrators of the swarm, a fourth phase of accessing the state of the deployments, via the cooperation interface, by this orchestrator, a fifth phase of sending a report of the state of the deployments, by this orchestrator, to the operator of the client application.

Thus, the deployment of multiple client applications, or even numerous client applications, in the same computer network, is both efficient and quick.

Preferably, several of said, preferably all of the, infrastructures of the same group being able to host the different components of the same client application are heterogeneous to one another.

Thus, the optimization of the deployment of the different components of the same client application is even more beneficial in terms of harmony between the requesting application and the selected resource infrastructure, since some components of the same client application have very different requirements, which would reduce the effectiveness of their operation if they had to be deployed on one and the same type of computing resource infrastructure.

Preferably, said score calculation for a component of a client application also integrates the score of the other components of the same client application so as to favor locating the different components of the same client application on the same infrastructure.

Preferably, said score calculation for said additional component of a client application also integrates the score of the other components of the same client application so as to favor locating the different components of the same client application on the same infrastructure.

Thus, when the components of the same client application nonetheless do not have requirements that are very different from one another, in order to improve the speed and frequency of communication between these different components during the operation of their client application, co-locating, i.e. locating the different components of the same client application at the level of the same resource infrastructure is favored anyway, especially if otherwise the score calculations of the different infrastructures give close results or results that are more or less equivalent to one another.

Preferably, each orchestrator of the same group embeds its own score calculation logic to carry out an evaluation, integrating equally the specificity of the type of associated infrastructure and its context of use.

Thus, each orchestrator is simultaneously autonomous and optimized to carry out each of its evaluations for each client application requesting hosting.

Preferably, an operator of the client application contacts any one of the orchestrators of the swarm to request the hosting of all or part of said application.

Preferably, an operator of the client application contacts any one of the orchestrators of the swarm, to request the hosting of said additional component of said application.

Thus, regardless of the orchestrator contacted, the operator of the client application is guaranteed to have a resource allocation decision which is on the one hand independent of the orchestrator contacted and on the other hand optimized based on its client application requirements.

Preferably, after receipt, by an orchestrator, of a request for hosting a client application, this orchestrator transmits all or part of the metadata of this client application to the other orchestrators of the swarm for their respective evaluations.

Preferably, after receipt, by an orchestrator, of a request for hosting a client application, this orchestrator transmits all or part of the metadata of said additional component of this client application to the other orchestrators of the swarm for their respective evaluations.

Thus, all the orchestrators of the same swarm wishing to participate in the evaluation of the requirements of a requesting client application can do so, since they receive, simply and quickly, all the information they need to carry out their own evaluation of these requirements of the requesting client application.

Preferably, in order to carry out its evaluation of its likelihoods to satisfy the requirements of a client application, each orchestrator of the swarm opens a session of predetermined duration, optionally renewable before the session end, the end of all the sessions of the orchestrators of the swarm triggering said consensus protocol.

Preferably, in order to carry out its evaluation of its likelihoods to satisfy the requirements of said additional component of this client application, each orchestrator of the swarm opens a session of predetermined duration, optionally renewable before the session end, the end of all the sessions of the orchestrators of the swarm triggering said consensus protocol.

Thus, when an orchestrator either aborts an ongoing evaluation by its own decision, or is forced to abort an ongoing evaluation for another reason, such as for example because of a failure of this orchestrator or because of a severed link with the other orchestrators, this defective orchestrator does not penalize the other orchestrators that successfully completed their evaluation in time, which other orchestrators would otherwise be obliged to wait, optionally for a very long time or even indefinitely, for the defective orchestrator.

Preferably, each orchestrator of the swarm has its own mode of evaluating its likelihoods to satisfy the requirements of a client application, this mode of evaluation being modifiable by each orchestrator of the swarm via a branch of an evaluation logic module.

Preferably, each orchestrator of the swarm has its own mode of evaluating its likelihoods to satisfy the requirements of said additional component of this client application, this mode of evaluation being modifiable by each orchestrator of the swarm via a branch of an evaluation logic module.

Thus, an administrator of the computer network retains the freedom and the possibility to manually modify the modes of evaluating any particular orchestrator of the swarm, if required.

Preferably, an orchestrator can decide to abort an ongoing evaluation for a client application if this client application has a particular profile unsuited to the infrastructure of this orchestrator.

Preferably, an orchestrator can decide to abort an ongoing evaluation for said additional component of this client application, if this client application has a particular profile unsuited to the infrastructure of this orchestrator.

Thus, this orchestrator saves time for itself and avoids polluting or slowing down the other orchestrators that are better suited to hosting a given client application.

Preferably, an operator of the client application uses a client interface of the orchestrator to discover the type of resources supported by the infrastructure associated with this orchestrator and request an application deployment from this orchestrator.

Thus, the operator of the client application can pre-select the orchestrator which it deems the most suitable, so that, if it is indeed this one which is selected by the consensus protocol within the swarm, the deployment of this client application on the infrastructure of this orchestrator, first provisionally pre-selected by the operator then definitively selected by the consensus protocol, is more immediate.

Preferably, each orchestrator of the swarm refuses to participate in the evaluations if its resources are too limited or if it has been configured to refuse new application deployments.

Thus, this orchestrator saves time for itself and avoids polluting or slowing down the other orchestrators that are better suited to hosting a given client application.

Preferably, a new orchestrator communicates its types of resources and its capacities on its cooperation interface to the other orchestrators of a swarm in order to be integrated in their swarm.

Thus, the remainder of the swarm can choose to accept or refuse this new orchestrator, based on its own requirements at the level of the swarm and of its associated strategy.

Preferably, the client applications describe, in the TOSCA model, their requirements to the orchestrator that they are contacting. This model is particularly simple and effective for describing the requirements of a client application in a way that subsequently facilitates their evaluation by the different orchestrators of the same swarm.

Preferably, at least one, preferably multiple, even more preferably all, of the orchestrators of the swarm each include: a module for communicating with the other orchestrators of the swarm on the cooperation interface, a client interface module for communicating with the operators of the client applications, a score calculation module for the client application, the requirements of which are communicated to it, a module for deploying a client application on the infrastructure associated with said orchestrator, the modules for client interface, score calculation and deployment of an application all communicating with the communication module.

Thus, this orchestrator structure optimizes the distribution of tasks within the same orchestrator, so as to enable it to simultaneously effectively carry out its evaluation and to share it quickly and simply with the other orchestrators of the swarm.

Other characteristics and benefits of the invention will become apparent upon reading the following description of a preferred embodiment of the invention, given as an example with reference to the attached drawings.

DETAILED DESCRIPTION OF THE INVENTION

The following figures will be described in conjunction with the first operation of initialization of this client application, but operation with the second operation of updating this client application by adding an additional component runs in a similar manner and that which is stated about the first operation can be applied directly to the second operation. When there is a difference, an additional figure is added to describe the difference in operation in terms of the addition of an additional component compared to the initial deployment of the application.

Figure 1:
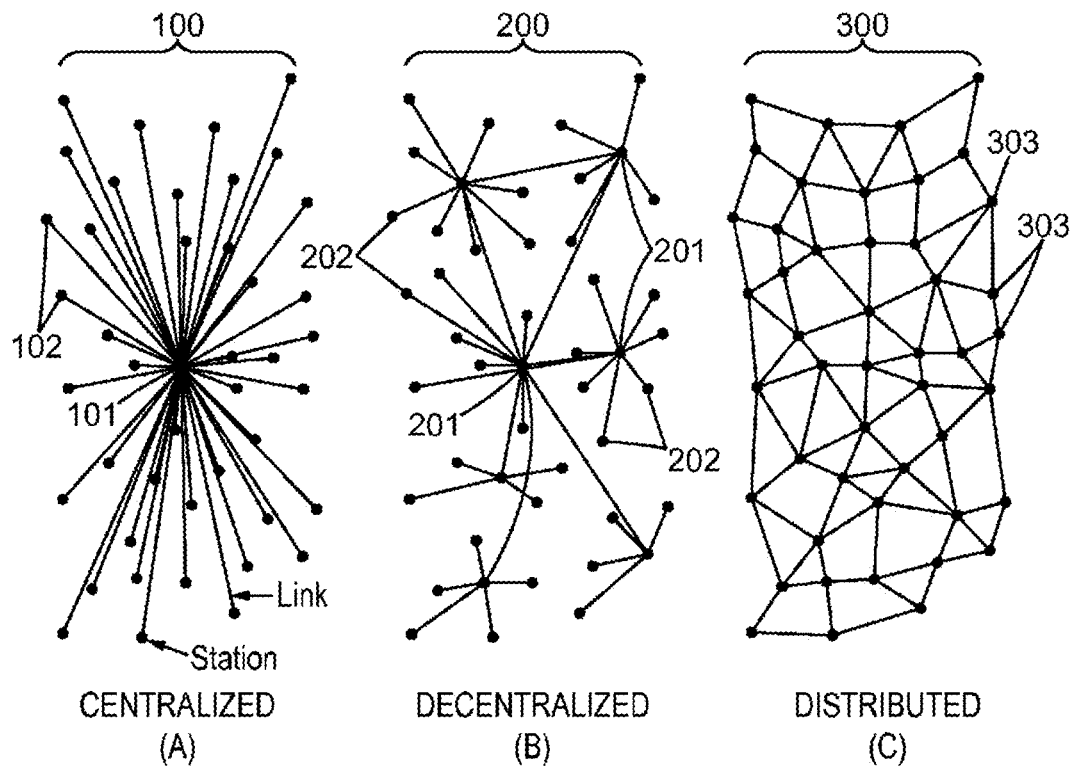
FIG. 1 schematically depicts a comparative example of computer network architectures.

FIG. 1 schematically depicts a comparative example of computer network architectures.

A first type of centralized computer network 100, corresponding to the first prior art, comprises a central node 101 to which all the secondary nodes 102 are directly connected. All the communications between two secondary nodes 102 pass through the central node 101. The central node 101 is therefore both a bottleneck for the transmission of messages and a single point of failure since, if it fails, none of the secondary nodes 102 can continue to communicate any longer with the other secondary nodes 102.

A second type of decentralized computer network 200, corresponding to the second prior art, comprises multiple central nodes 201 connected to one another, to which groups of secondary nodes 202 are respectively and directly connected. All the communications between two secondary nodes 202 of the same group pass through the central node 201 of this group. All the communications between two secondary nodes 202 of two different groups pass through multiple central nodes 201, and can optionally take multiple different paths passing through different central nodes 201. The central nodes 201 are therefore both bottlenecks for the transmission of messages, but less than for the centralized computer network 100 since, for the decentralized computer network 200, only a part of the communications pass through each of the central nodes 201, and single points of failure, but which are less critical than for the centralized computer network 100 since, for the decentralized computer network 200, only a part of the communications pass through each of the central nodes 201.

A third type of distributed computer network 300, of the type of that of the invention, only comprises simple nodes 303 between which a relatively dense mesh enables all the communications between two simple nodes 303 to be able to circulate by numerous routes, such that no simple node 303 could become a bottleneck for the transmission of messages or a single point of failure if it were to fail. The distributed computer network 300 is more robust and more fluid than the centralized 100 and decentralized 200 computer networks.

Figure 2:
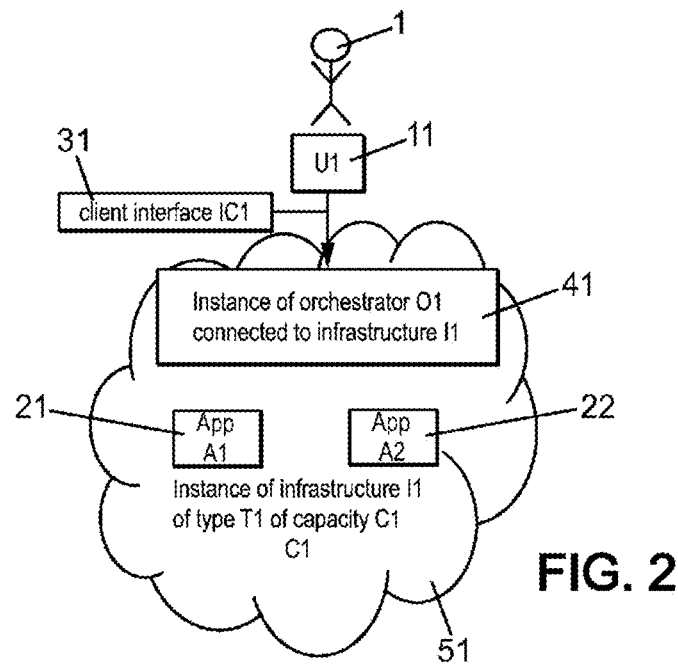
FIG. 2 schematically depicts an example of association between orchestrator and infrastructure in a computer network according to one embodiment of the invention.

FIG. 2 schematically depicts an example of association between orchestrator and infrastructure in a computer network according to one embodiment of the invention.

An operator 1 manages a client application from a user terminal 11 and communicates by a client interface 31 with an orchestrator 41 managing a computing resource infrastructure 51, more specifically with an instance of orchestrator 41 connected to its resource infrastructure 51. The aim of the operator 1 is to obtain the hosting of its client application on the infrastructure 51, in particular the hosting of the components 21 and 22 of this client application, i.e. resources of the infrastructure 51 are allocated to the components 21 and 22 of this client application.

The orchestrator 41 is an autonomous element capable of managing the deployment of a client application on its infrastructure 51. The orchestrator 41 is depicted with its underlying infrastructure 51 which is connected thereto, and a client application deployed on this infrastructure 51. The orchestrator 41 supports the provision of infrastructure resources of a certain type T1 in order to cause the hosted client application to function. The limit of capacity C1 depends on the limits of the connected infrastructure 51. A user terminal 11 of the system uses a client interface 31 to discover the types of resources supported by the interface 51 and submit a client application deployment to this orchestrator 41.

Figure 3:
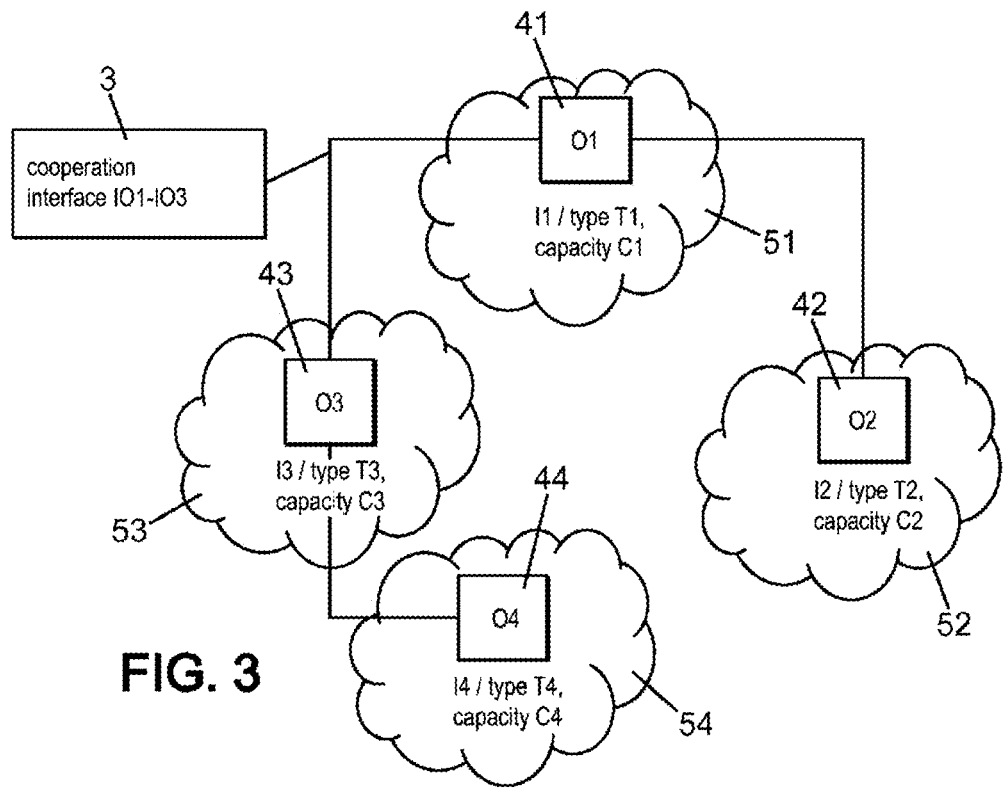
FIG. 3 schematically depicts an example of a swarm of orchestrators in a computer network according to one embodiment of the invention.

FIG. 3 schematically depicts an example of a swarm of orchestrators in a computer network according to one embodiment of the invention.

Four orchestrators 41, 42, 43 and 44, which form a swarm of orchestrators, respectively manage four infrastructures 51, 52, 53 and 54 associated therewith. These four orchestrators 41 to 44 communicate with one another via a cooperation interface 3 and exchange the information they require with one another.

This swarm of orchestrators 41 to 44 is formed by connecting the instances of the orchestrators 41 to 44. This makes it possible to extend the capacities of each of the orchestrators 41 to 44 with the capacities of the other orchestrators 41 to 44 which are directly or indirectly connected thereto. For example, the user terminals of the orchestrator 41 will be able to benefit from the resources of the infrastructures 51 to 54 underlying the orchestrators 42 to 44. The user terminals can transmit a request to any of the orchestrators 41 to 44 and thereby benefit from the resources available on all the infrastructures 51 to 54 associated with this swarm of orchestrators 41 to 44.

Figure 4:
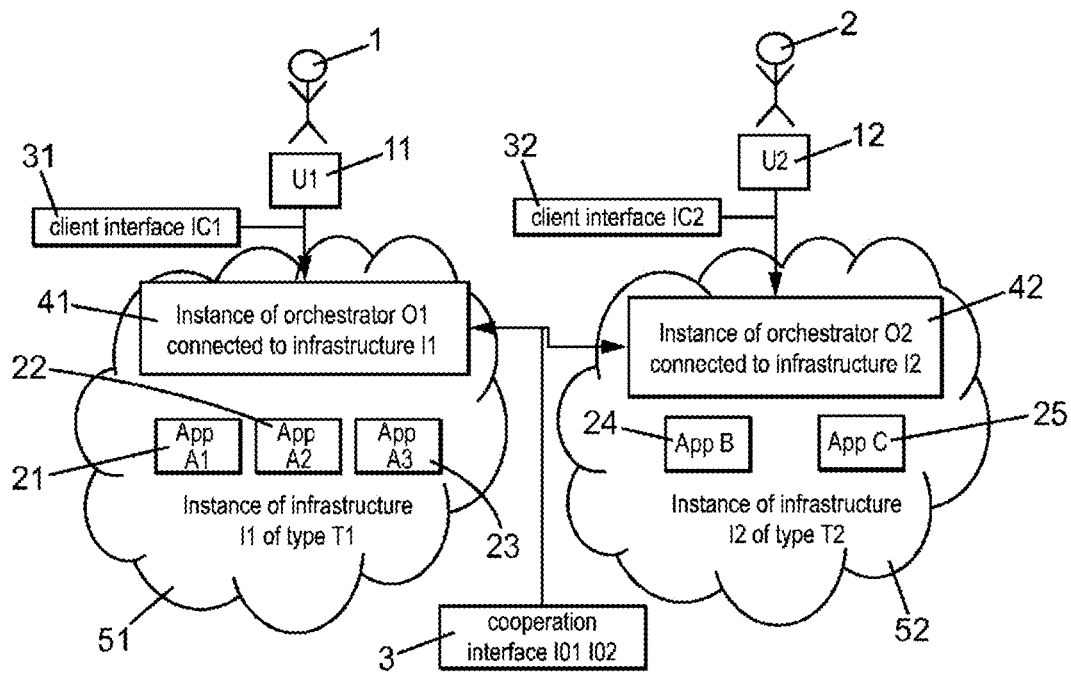
FIG. 4 schematically depicts an example of deployment of client applications, each hosted on the same infrastructure in a computer network according to one embodiment of the invention.

FIG. 4 schematically depicts an example of deployment of client applications, each hosted on the same infrastructure in a computer network according to one embodiment of the invention. Two different client applications can be hosted on two different infrastructures.

The orchestrators 41 and 42, managing respectively the resource infrastructures 51 and 52, communicate with one another via the cooperation interface 3. The swarm formed by the two orchestrators 41 and 42 connected to one another supports the deployment of the different client applications on two infrastructures 51 and 52.

An operator 1 manages multiple client applications from a user terminal 11 and communicates by a client interface 31 with an orchestrator 41 managing a computing resource infrastructure 51. The aim of the operator 1 is to obtain hosting of its client applications on one or the other of the infrastructures 51 or 52, in particular the hosting of the components 21, 22 and 23, of a first client application, and also the sole component 25 of a second client application, i.e. in this case, resources of the infrastructure 51 will be allocated to the components 21 to 23 of the first client application, while resources of the infrastructure 52 will be allocated to the single component 24 of the second client application.

An operator 2 manages a third client application from a user terminal 12 and communicates by a client interface 32 with an orchestrator 42 managing a computing resource infrastructure 52. The aim of the operator 2 is to obtain the hosting of its client application on one or the other of the infrastructures 51 or 52, in particular the hosting of the single component 25 of the third client application, i.e. in this case, resources of the infrastructure 52 will be allocated to the single component 25 of the third client application.

Figure 5:
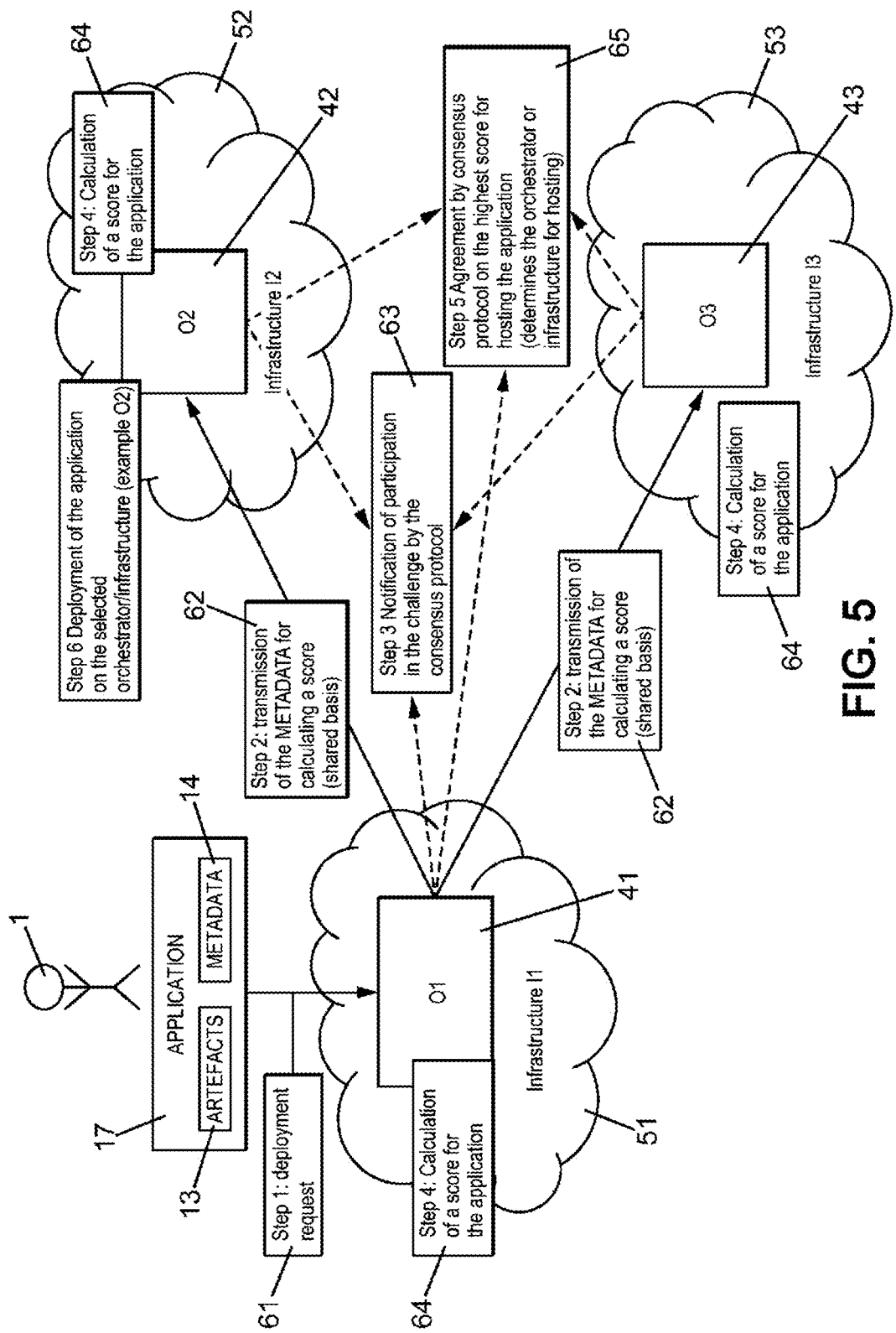
FIG. 5 schematically depicts an example of running the decision method for hosting each of the client applications on the same infrastructure in a computer network according to one embodiment of the invention.

FIG. 5 schematically depicts an example of running the decision method for hosting each of the client applications on the same infrastructure in a computer network according to one embodiment of the invention.

Three orchestrators 41, 42 and 43, which form a swarm, respectively manage three infrastructures 51, 52 and 53 associated therewith. These three orchestrators 41 to 44 communicate with one another via a cooperation interface via a consensus protocol, depicted here by arrows with dashed lines for the decision method for resource allocation, except for the transmission of information relating to the requirements of the client application 17 which is depicted here by arrows with solid lines, while also being implemented via the cooperation interface.

An operator 1 manages a client application 17 and communicates with the orchestrator 41. The aim of the operator 1 is to obtain the hosting of its client application on one or the other of the infrastructures 51 to 53. The client application 17 includes in particular artifacts 13 and metadata 14. The artifacts 13 include in particular configuration information, such as for example binary configuration files or an install script, and also other objects of use for the deployment of the client application 17 on the chosen infrastructure. The metadata 14 include in particular additional descriptions of the context of the client application 17, such as for example a description of the environment in which the client application 17 will be deployed, a description of the characteristics of the host machine which will host the client application 17, or a modeling of the deployment of the client application 17.

The decision method comprises the following successive steps. Firstly, a first step 61 of requesting deployment of all or part of the client application 17 from the orchestrator 41. Then, a second step 62 of transmitting the requirements of all or part of said client application 17 to the orchestrators 42 and 43 on their cooperation interface. Next, a third step 63 of notifying the participation or non-participation in the evaluations by the orchestrators 41 to 43, on their cooperation interface. Then, a fourth step 64 of carrying out the evaluation by calculating a score for all or part of said client application 17 by each of the orchestrators 41 to 43 participating in the evaluations. Next, a fifth step 65 of agreeing, by the consensus protocol, on the selection of that one of the infrastructures 51 to 53 of the group, for hosting all or part of said client application 17, which achieved the best score. Finally, a sixth step will be carried out, of deploying all or part of said application 17 on the selected infrastructure 51, 52 or 53, this step of deployment being subsequently described in more detail in conjunction with FIG. 9.

When a client application 17 is subjected to the orchestrator 41, a distributed decision method based on a consensus protocol runs in order to determine the instance of orchestrator 41 to 43 and therefore the corresponding infrastructure 51 to 53 which will manage all the components or modules of this client application 17. A component of client application 17 is a unit for deployment of this client application 17 in the infrastructure chosen, which is one of the infrastructures 51 to 53. This component can be hosted by a physical machine, a virtual machine or a container, which are simply referred to as compute nodes.

The decision method takes as input the metadata 14 of the client application 17, which metadata 14 provide:

- a description of the client application 17 and of its structure in terms of nodes and relationships, comprising:
  - information relating to the nodes:
  - at the level of the infrastructure in terms of calculation, storage and network,
  - and at the software level,
  - information relating to the relationships:
  - of the type "hosted on",
  - of the type "connected to",
  - a list of mandatory requirements globally or for each node, such as the type of machine, e.g. x86 with graphics processor, the type of operating system, e.g. Linux (registered trademark), the type of distribution system, e.g. Linux (registered trademark) or Windows (registered trademark),
  - a list of optional requirements globally or for each node and relationship, such as in particular the location, e.g. in France, the type of media, e.g. MPI (Message Passing Interface).

Upon receipt of this metadata 14, each orchestrator 41 to 43 decides if it is participating in the evaluation of the likelihoods of satisfying the requirements of this client application 17, in order to determine the instance of orchestrator hosting the deployment of this client application 17. If the orchestrator, for example the orchestrator 42, chooses to participate in the evaluation, then this orchestrator 42 opens a session with a short lifetime which it will have to renew regularly to prolong the lifetime thereof, as long as the consensus protocol has not announced the results of its own evaluation which is therefore its contribution to the overall evaluation carried out by the whole of the swarm of orchestrators 41 to 43. If the orchestrator 42 is subject to failure during its calculation, its session will not be renewed and consequently its session will be invalidated at the end of its lifetime. The evaluation, by all the orchestrators participating within the swarm, ends when all the sessions for participation in this evaluation have ended. This makes it possible to define the moment at which the evaluation of the final result can be determined.

For each participating orchestrator 41 to 43, its calculation of the score for evaluating its capacities for managing and therefore hosting this client application 17, is implemented from the metadata 14 of this client application 17 and also from the capacities available, at the time of the evaluation, of the infrastructure 51 to 53 associated with this orchestrator 41 to 43, and also by taking into account the mean hourly cost thereof, standardized in order to be comparable to the scores calculated for the other evaluated characteristics.

The capacities of the underlying infrastructure 51 to 53 are, in particular: the type of resources supported, both in terms of calculation and storage or network, the fill level thereof (if this infrastructure 51 to 53 is more or less used), the health indicator thereof (if this infrastructure 51 to 53 is subject to errors, and how frequently).

The calculation algorithm runs through the TOSCA graph of the application, node by node, running, for example, the logic which is represented in the following table 1:

TABLE 1

| | Calculation logic |
|---|---|
| Initial value | score = 0 |
| Support for a mandatory requirement, i.e. harmony with the capacities of the underlying infrastructure | If mandatory requirement supported, then score +100 Otherwise, score = 0 and exit the logic |
| Support for an optional requirement, i.e. harmony with the capacities of the underlying infrastructure | If optional requirement supported, then score +100 |
| Compatibility with the fill level | If fill level for this type of resource <70%, then score +100, if fill level >90%, then score −100, Otherwise, score maintained |

TABLE 1-continued

| | Calculation logic |
|---|---|
| Compatibility with the overall health level | If the last error occurred less than one hour ago, then score −100, If the last error occurred more than 24 hours ago, then score +100, Otherwise, score maintained |
| Impact of the cost of the infrastructure | score −10 times the standardized cost |

This score calculation logic is a logic customizable by a mechanism for plugging in a score calculation customization software module. This score calculation logic is customizable separately at the level of each orchestrator 41 to 43.

The orchestrators 41 to 43 decide on the orchestrator, for example orchestrator 43, which will be responsible for the deployment according to a consensus protocol making it possible to select the highest score obtained. If two orchestrators have an identical score, one of these two orchestrators is selected randomly.

Figure 5A:
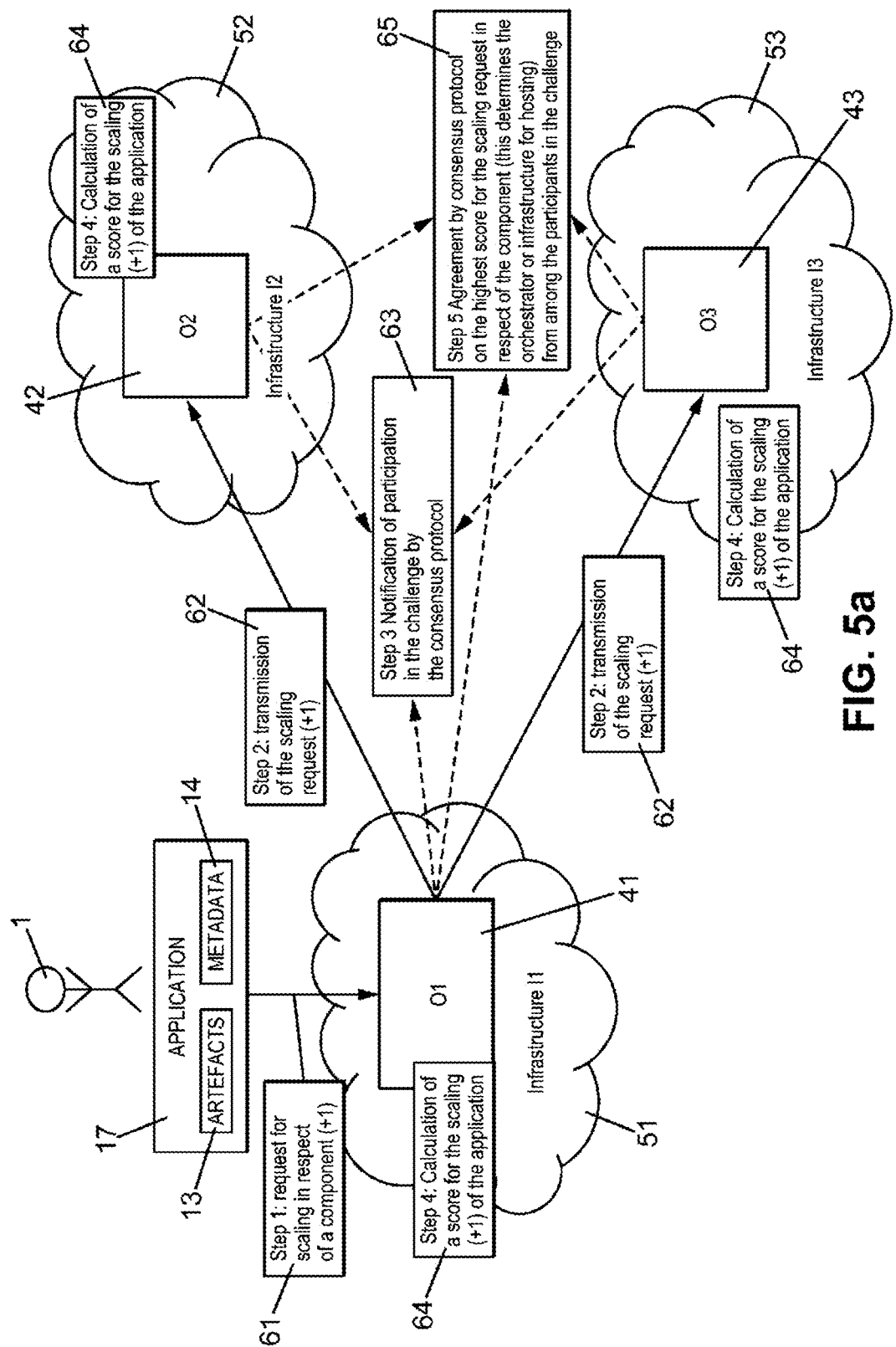
FIG. 5a schematically depicts an example of running the decision method for hosting the additional component of a client application already hosted on one or more infrastructures in a computer network according to one embodiment of the invention.

FIG. 5*a* schematically depicts an example of running the decision method for hosting an additional component, whether a new component not yet hosted or else the replication of an existing, already-hosted component, of a client application already hosted on the same infrastructure or distributed over multiple infrastructures in a computer network according to one embodiment of the invention. This addition of an additional component of an application otherwise already installed and hosted is called carrying out another scaling (+1) of this client application.

Three orchestrators 41, 42 and 43, which form a swarm, respectively manage three infrastructures 51, 52 and 53 associated therewith. These three orchestrators 41 to 43 communicate with one another via a cooperation interface via a consensus protocol, depicted here by arrows with dashed lines for the decision method for resource allocation, except for the transmission of information relating to the requirements of the client application 17 which is depicted here by arrows with solid lines, while also being implemented via the cooperation interface.

An operator 1 manages a client application 17 and communicates with the orchestrator 41. The aim of the operator 1 is to obtain the hosting of the additional component of its client application on one or the other of the infrastructures 51 to 53. The client application 17 includes in particular artifacts 13 and metadata 14. The artifacts 13 include in particular configuration information, such as for example binary configuration files or an install script, and also other objects of use for the deployment of the additional component of the client application 17 on the chosen infrastructure. The metadata 14 include in particular additional descriptions of the context of the additional component of the client application 17, such as for example a description of the environment in which the additional component of the client application 17 will be deployed, a description of the characteristics of the host machine which will host the additional component of the client application 17, or a modeling of the deployment of the additional component of the client application 17.

The decision method comprises the following successive steps. Firstly, a first step 61 of requesting deployment of the additional component of the client application 17 from the orchestrator 41. Then, a second step 62 of transmitting the requirements of the additional component of said client application 17 to the orchestrators 42 and 43 on their cooperation interface. Next, a third step 63 of notifying the participation or non-participation in the evaluations by the orchestrators 41 to 43, on their cooperation interface. Then, a fourth step 64 of carrying out the evaluation by calculating a score for the additional component of said client application 17 by each of the orchestrators 41 to 43 participating in the evaluations. Next, a fifth step 65 of agreeing, by the consensus protocol, on the selection of that one of the infrastructures 51 to 53 of the group, for hosting the additional component of said client application 17, which achieved the best score. Finally, deployment of the additional component of said application 17 on the selected infrastructure 51 or 52 or 53 will be carried out.

When the additional component of a client application 17 is subjected to the orchestrator 41, a distributed decision method based on a consensus protocol runs in order to determine the instance of orchestrator 41 to 43 and therefore the corresponding infrastructure 51 to 53 which will manage the additional component of this client application 17. An additional component of client application 17 is another unit for deployment of this client application 17 in the infrastructure chosen, which is one of the infrastructures 51 to 53. This additional component can be hosted by a physical machine, a virtual machine or a container, which are simply referred to as compute nodes.

The decision method takes as input the metadata 14 of the additional component of the client application 17, which metadata 14 provide:
  a description of the additional component of the client application 17 and of its structure in terms of nodes and relationships, comprising:
  information relating to the nodes:
  at the level of the infrastructure in terms of calculation, storage and network,
  and at the software level,
  information relating to the relationships:
  of the type "hosted on",
  of the type "connected to",
  a list of mandatory requirements globally or for each node, such as the type of machine, e.g. x86 with graphics processor, the type of operating system, e.g. Linux (registered trademark), the type of distribution system, e.g. Linux (registered trademark) or Windows (registered trademark),
  a list of optional requirements globally or for each node and relationship, such as in particular the location, e.g. in France, the type of media, e.g. MPI (Message Passing Interface).

Upon receipt of this metadata 14, each orchestrator 41 to 43 decides if it is participating in the evaluation of the likelihoods of satisfying the requirements of the additional component of this client application 17, in order to determine the instance of orchestrator hosting the deployment of the additional component of this client application 17. If the orchestrator, for example the orchestrator 42, chooses to participate in the evaluation, then this orchestrator 42 opens a session with a short lifetime which it will have to renew regularly to prolong the lifetime thereof, as long as the consensus protocol has not announced the results of its own evaluation which is therefore its contribution to the overall evaluation carried out by the whole of the swarm of orchestrators 41 to 43. If the orchestrator 42 is subject to failure during its calculation, its session will not be renewed and consequently its session will be invalidated at the end of its lifetime. The evaluation by all the orchestrators participating within the swarm ends when all the sessions for participation in this evaluation have ended. This makes it possible to define the moment at which the evaluation of the final result can be determined.

For each participating orchestrator 41 to 43, its calculation of the score for evaluating its capacities for managing and therefore hosting the additional component of this client application 17 is implemented from the metadata 14 of the additional component of this client application 17 and also from the capacities available, at the time of the evaluation, of the infrastructure 51 to 53 associated with this orchestrator 41 to 43, and also by taking into account the mean hourly cost thereof, standardized in order to be comparable to the scores calculated for the other evaluated characteristics.

The capacities of the underlying infrastructure 51 to 53 are, in particular: the type of resources supported, both in terms of calculation and storage or network, the fill level thereof (if this infrastructure 51 to 53 is more or less used), the health indicator thereof (if this infrastructure 51 to 53 is subject to errors, and how frequently).

The calculation algorithm runs through the TOSCA graph of the application, node by node, running, for example, according to a logic similar to that described for FIG. 5 with Table 1.

This score calculation logic is a logic customizable by a mechanism for plugging in a score calculation customization software module. This score calculation logic is customizable separately at the level of each orchestrator 41 to 43.

The orchestrators 41 to 43 decide on the orchestrator, for example orchestrator 43, which will be responsible for the deployment according to a consensus protocol making it possible to select the highest score obtained. If two orchestrators have an identical score, one of these two orchestrators is selected randomly.

Figure 6:
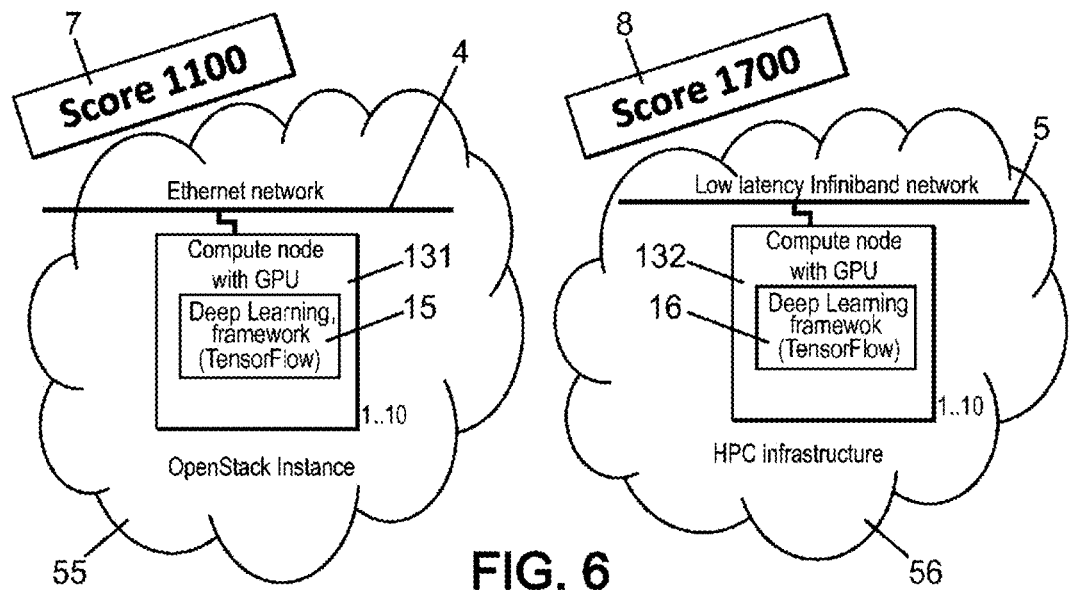
FIG. 6 schematically depicts an example of the score calculation result during the running of the decision method for hosting each of the client applications on the same infrastructure in a computer network according to one embodiment of the invention.

FIG. 6 schematically depicts an example of the score calculation result during the running of the decision method for hosting each of the client applications on the same infrastructure in a computer network according to one embodiment of the invention.

A first infrastructure 55 comprises an Ethernet network 4 to which a compute node 131 with graphics processor is connected, capable of hosting a client application by allocating it the resources 15 if its calculated score 7 is the best.

A second infrastructure 56 comprises a low latency network 5 of "Infiniband" type to which a compute node 132 with graphics processor is connected, capable of hosting this client application by allocating it the resources 16 if its calculated score 8 is the best.

Since the score 7, with a value for example of 1100, is less than the score 8, with a value for example of 1700, the consensus protocol will decide that the client application will be hosted on the second infrastructure 56 at the node 132 by allocating it the resources 16.

This is, by way of illustration, an example of metadata 14 for a client application 17 of "deep learning" type. The mandatory requirements are for example: 10 compute nodes of x86 type, an image of Linux (registered trademark) type, network between the nodes. The optional requirements are for example: all the compute nodes are equipped with a graphics processor, all the compute nodes are interconnected by a low latency network. The deployment is implemented on a swarm of orchestrators composed of two orchestrators (not depicted on this figure for the sake of simplicity) and of the two associated underlying infrastructures 55 and 56. The infrastructure 55 is of the "OpenStack" type and has a mean cost standardized to 10, while the infrastructure 56 is based on "HPC" technology and has a mean cost standardized to 50. The saturation level of the infrastructure 55 is less than 50%, while that of the infrastructure 56 is 80%. There have not been any recent errors on either of the two infrastructures 55 and 56.

The calculation of the scores carried out by the two orchestrators for their two respective infrastructures 55 and 56 is described in the following Table 2:

TABLE 2

| | Infrastructure 55 | Infrastructure 56 |
|---|---|---|
| Initial value | score = 0 | score = 0 |
| Support for mandatory requirements (10 nodes) | score +10 × 100 = score +1000 | score +10 × 100 = score +1000 |
| Support for an optional requirement, i.e. harmony with the capacities of the underlying infrastructure | score +0 (no graphics processor) | score +10 * 100 (graphics processor) = score +1000, then score +100 (low latency network) |
| Compatibility with the fill level | score +100 | score +0 |
| Compatibility with the overall health level | score +100 | score +100 |
| Impact of the cost of the infrastructure | score −10 × 10 = score −100 | score −10 × 50 = score −500 |
| Total of the scores | final score = 1100 | final score = 1700 |

The highest score is obtained by the orchestrator associated with the infrastructure 56, it is therefore this one which will manage the "deep learning" client application which will be hosted by the infrastructure 56.

Figure 7:
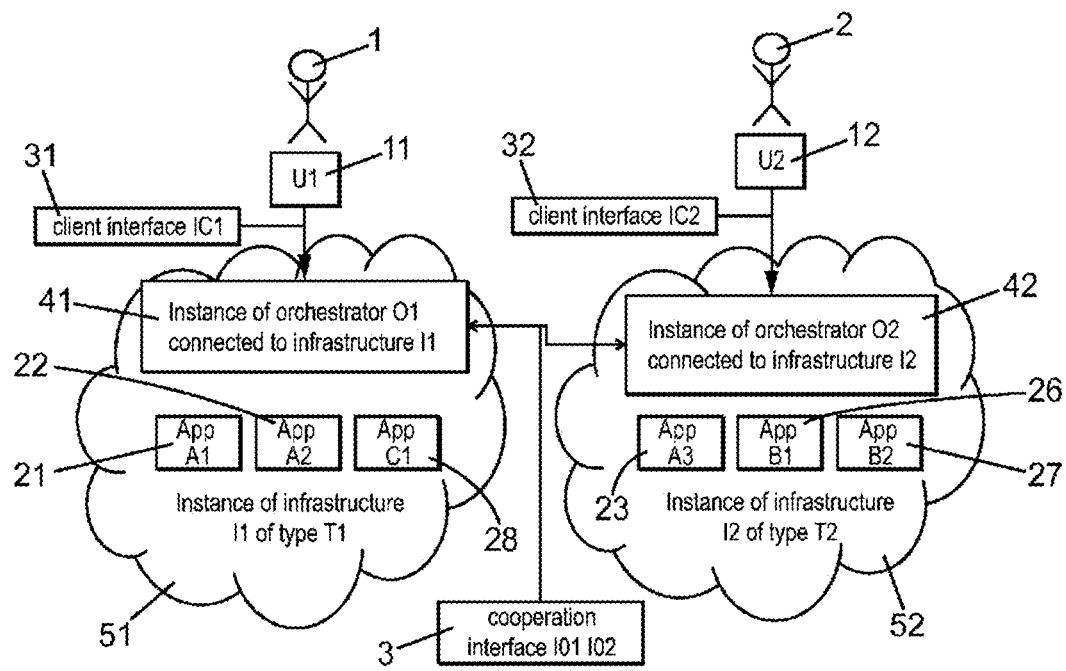
FIG. 7 schematically depicts an example of deployment of client applications, each hosted on multiple different infrastructures in a computer network according to one embodiment of the invention.

FIG. 7 schematically depicts an example of deployment of client applications, each hosted on multiple different infrastructures in a computer network according to one embodiment of the invention.

The orchestrators 41 and 42, managing respectively the resource infrastructures 51 and 52, communicate with one another via the cooperation interface 3, in order this time not to distribute the client applications in their entirety between the different infrastructures 51 and 52, but in order to distribute these client applications component by component between the different infrastructures 51 and 52, some client applications having their different components optionally distributed between the two infrastructures 51 and 52.

The aim of the operators 1 and 2 is to obtain hosting of the different components of its client applications on one or the other of the infrastructures 51 or 52, in particular the hosting of the components 21, 22 and 23, of a first client application, of the components 26 and 27, of a second client application, and also the sole component 28 of a third client application, i.e. in this case, resources of the infrastructure 51 will be allocated to the first two components 21 and 22 of the first client application, and also to the single component 28 of the third client application, while resources of the infrastructure 52 will be allocated to the third component 23 of the first client application, and also to the two components 26 and 27 of the second client application.

The client application is said to be "hybrid" when it is managed by multiple orchestrators and hosted on multiple infrastructures, preferably of technologies that are respectively different from one another.

Figure 8:
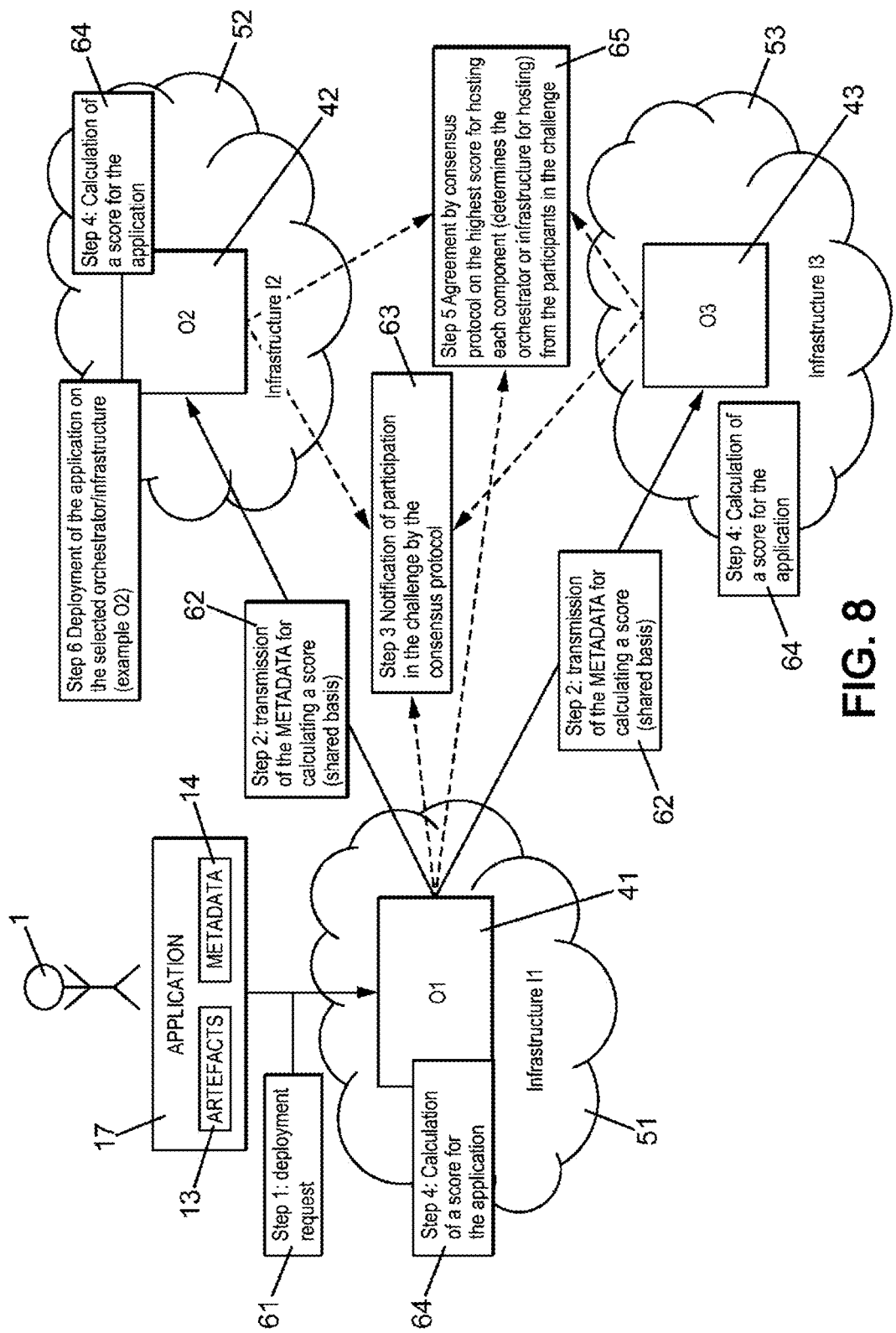
FIG. 8 schematically depicts an example of running a first part of the decision method for hosting each of the client applications on multiple different infrastructures in a computer network according to one embodiment of the invention.

FIG. 8 schematically depicts an example of running a first part of the decision method for hosting each of the client applications on multiple different infrastructures in a computer network according to one embodiment of the invention.

The decision method comprises the same successive steps as in FIG. 5, but said steps are run successively, in parallel for each client application component, and no longer only for each client application in its entirety.

When a client application 17 is subjected to the orchestrator 41, a distributed decision method based on a consensus protocol runs in order to determine the instance(s) of orchestrators 41 to 43 and of associated infrastructures 51 to 53 which will each manage the components of the client application 17.

The distributed decision method runs in the same way as in FIG. 5, except that the score calculation for each orchestrator 41 to 43 is now carried out component by component of the client application 17 and no longer in one go for the whole of the client application 17 as in FIG. 5. Moreover, for a given node on a given infrastructure, the score of the neighboring nodes, i.e. those that are directly dependent on the given node, can be involved in the score calculation of the given node so as to favor co-location of the different components of the client application 17, especially if the number of nodes and infrastructures is large.

Figure 9:
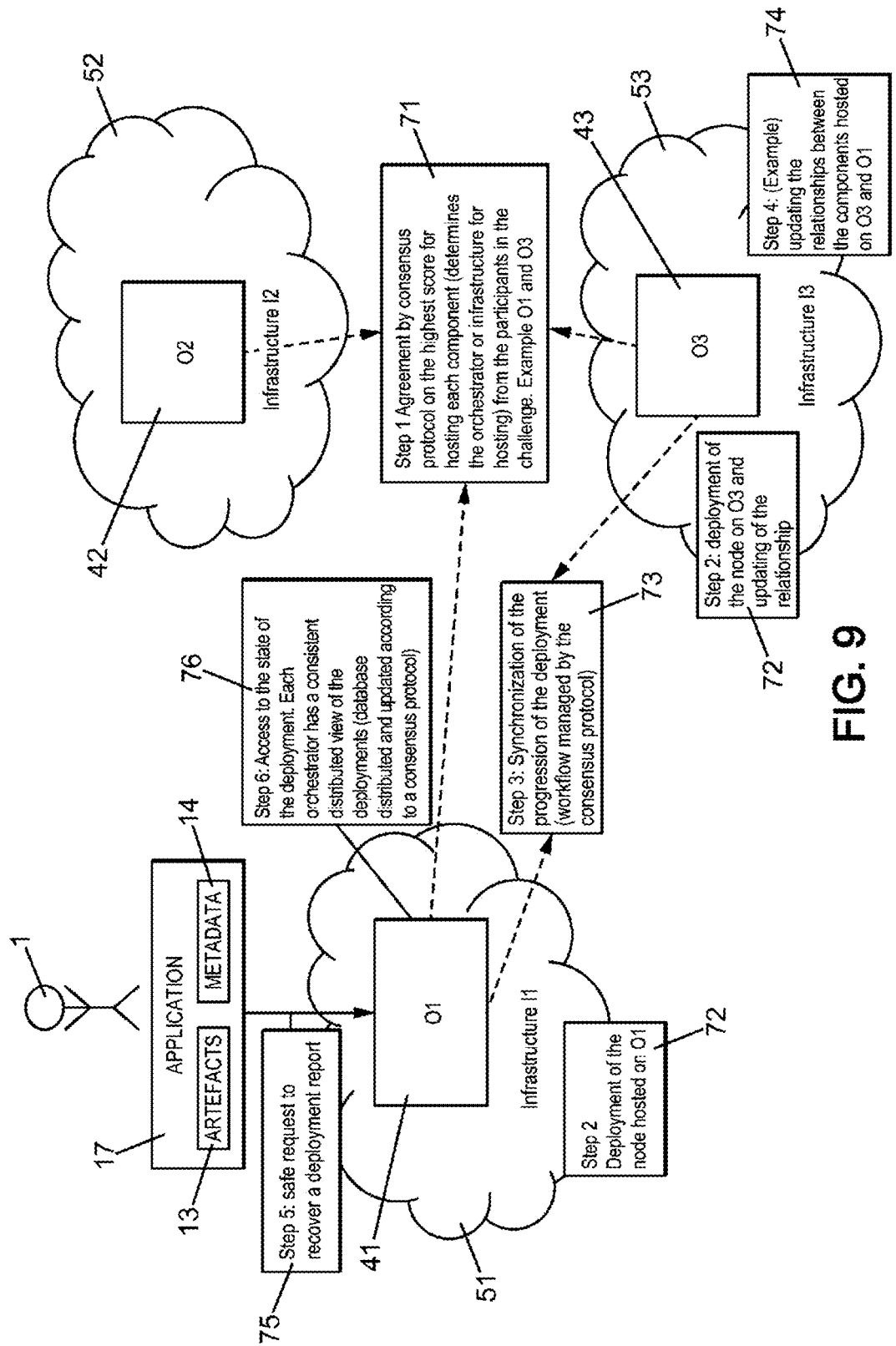
FIG. 9 schematically depicts an example of running a second part of the decision method for hosting each of the client applications on multiple different infrastructures in a computer network according to one embodiment of the invention.

FIG. 9 schematically depicts an example of running a second part of the decision method for hosting each of the client applications on multiple different infrastructures in a computer network according to one embodiment of the invention. FIG. 9 depicts the different phases of the deployment step which is carried out after the other deployment steps carried out in FIG. 8. The network part depicted in FIG. 9 is identical to that depicted in FIG. 8.

This deployment step comprises the following phases. Firstly, a first phase 71 of launching multiple deployments of multiple discrete components of the same client application, implemented in parallel on multiple different infrastructures 51 to 53 selected from the same group. Then, a second phase 72 of synchronizing said deployments with one another, during said deployments. Next, a third phase 73 of updating the relationships between the different components of this same client application hosted on the different infrastructures 51 to 53 of this same group. Then, a fourth phase 74 of requesting a report of the deployments, by the operator 1 of the client application, from the orchestrator 41. Next, a fifth phase 75 of accessing the state of the deployments, via the cooperation interface (depicted here by arrows with dashed lines), by this orchestrator 41. Finally, a sixth phase 76 of sending a report of the state of the deployments, by this orchestrator 41, to the operator 1 of the client application. Moreover, if multiple applications, each having one or more components, have to be deployed, they may also all be deployed in parallel to one another.

For the deployment of a hybrid client application 17, the orchestrators 41 to 43 run the life cycle of the client application 17 in a distributed manner. Technically, the life cycle of the application is described in a workflow and constitutes one of the items of metadata 14 of the client application 17. This workflow is composed of units managing the life cycle of each component of the client application 17 independently of one another. The transitions in the workflow enable the orchestration of the relationships between the different components of the same client application 17. The workflow is therefore distributed over all of the orchestrators 41 to 43 responsible for the deployment of units of the workflow. Each orchestrator 41 to 43 is responsible for running the steps of the components which will be hosted by its respective infrastructure 51 to 53. The use of a consensus protocol makes it possible to synchronize the steps and therefore to trigger the transitions of the workflow at the desired time, i.e. only triggering a step B that needs the prior completion of step A when this step A has actually been completed.

Figure 10:
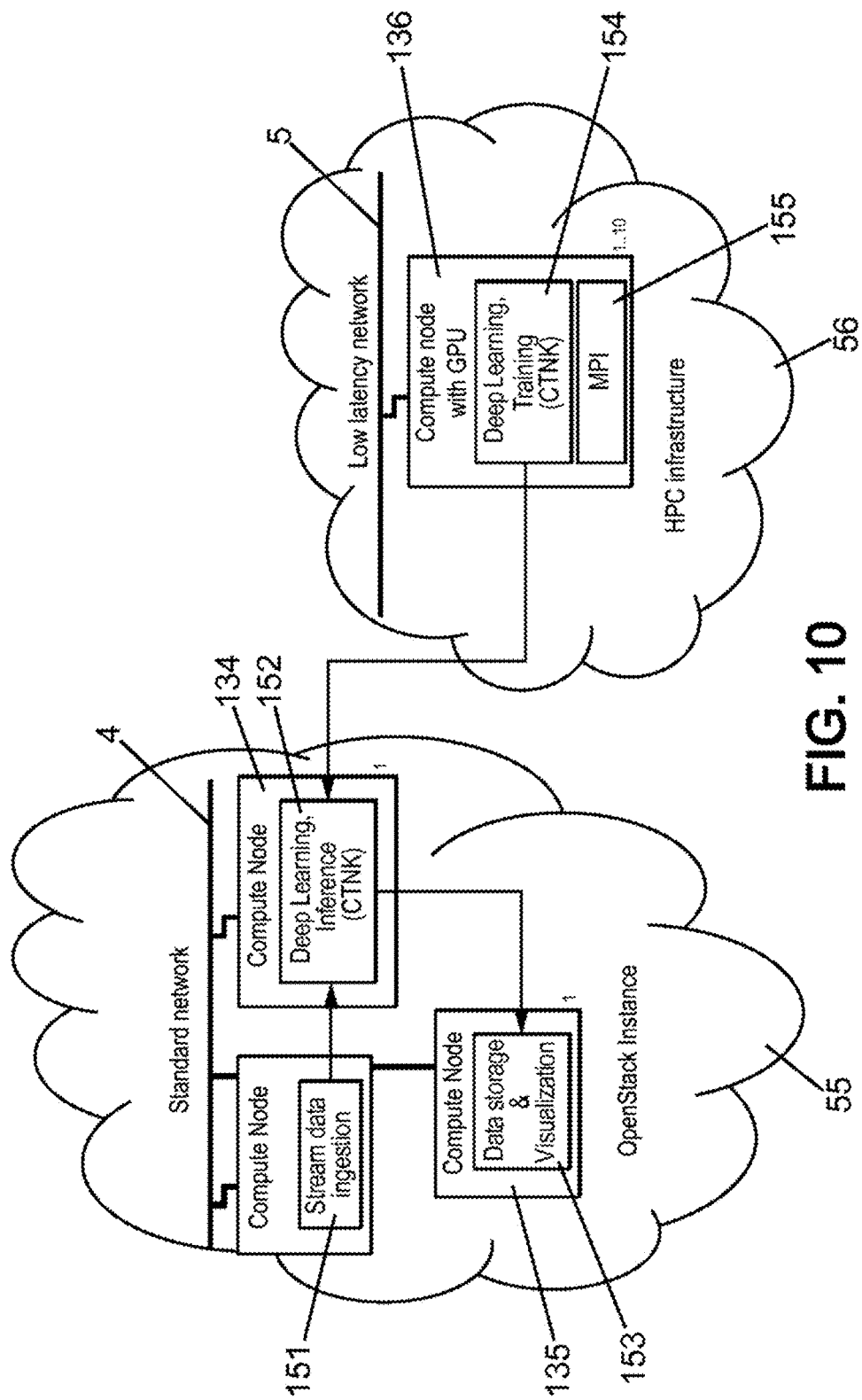
FIG. 10 schematically depicts another example of deployment of client applications, each hosted on multiple different infrastructures in a computer network according to one embodiment of the invention.

FIG. 10 schematically depicts another example of deployment of client applications, each hosted on multiple different infrastructures in a computer network according to one embodiment of the invention.

A first infrastructure 55 comprises an Ethernet network 4 to which compute nodes 133, 134 and 135, capable of hosting components of a client application, are connected.

A second infrastructure 56 comprises a low latency network 5 to which a compute node 136 with graphics processor, capable of hosting other components of this client application, is connected.

The consensus protocol has decided that component 151 of the client application will be hosted on node 133 of the first infrastructure 55, that component 152 of this client application will be hosted on node 134 of the first infrastructure 55, that component 155 of this client application will be hosted on node 135 of the first infrastructure 55, that components 154 and 155 of this client application will be hosted on node 136 of the second infrastructure 56.

Figure 10A:
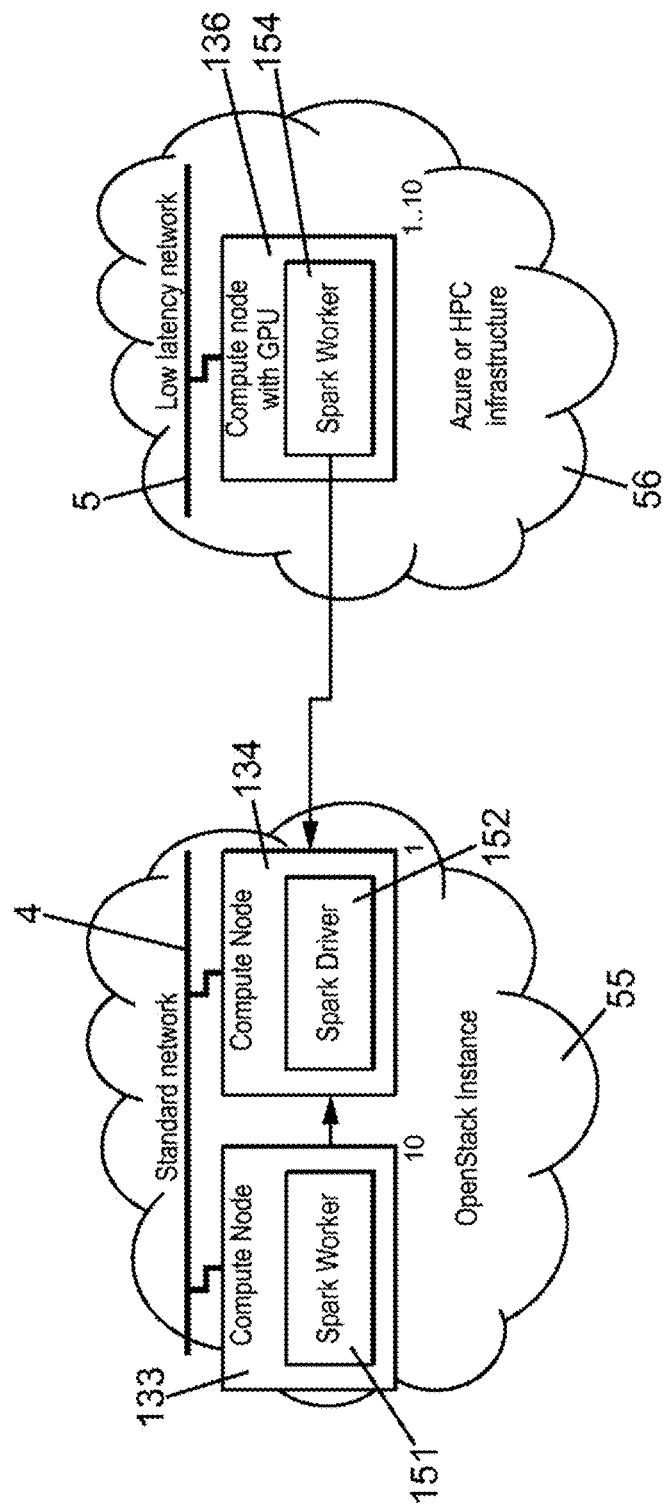
FIG. 10a schematically depicts another example of deployment of at least one additional component of at least one client application already hosted on multiple different infrastructures in a computer network according to one embodiment of the invention.

FIG. 10a schematically depicts another example of deployment of at least one additional component of at least one client application already hosted on multiple different infrastructures in a computer network according to one embodiment of the invention.

A first infrastructure 55 comprises an Ethernet network 4 to which compute nodes 133 and 134, capable of hosting components of a client application, are connected.

A second infrastructure 56 comprises a low latency network 5 to which a compute node 136 with graphics processor, capable of hosting other components of this client application, is connected.

The consensus protocol has decided that one or more additional components 151 of the client application will be hosted on node 133 of the first infrastructure 55, while component 152 of this client application is already hosted on node 134 of the first infrastructure 55, and while component 154 of this client application is already hosted on node 136 of the second infrastructure 56.

Figure 11:
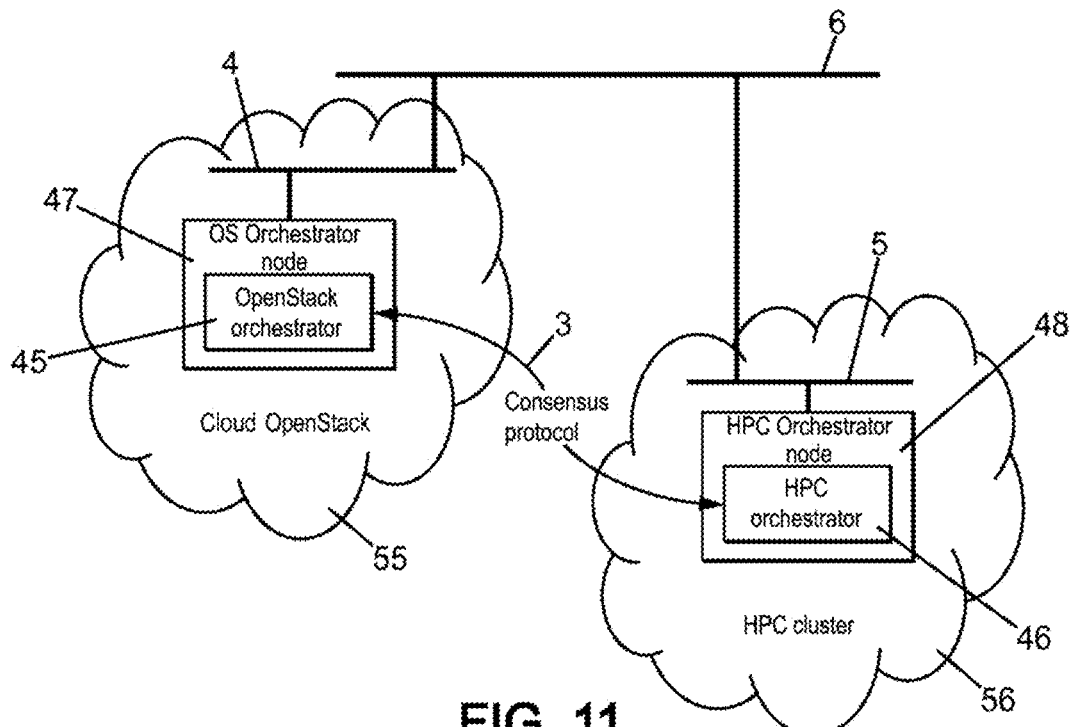
FIG. 11 schematically depicts another example of a swarm of orchestrators in a computer network according to one embodiment of the invention.

FIG. 11 schematically depicts another example of a swarm of orchestrators in a computer network according to one embodiment of the invention.

A first infrastructure 55 of "Cloud OpenStack" type comprises a network 4 to which an orchestrator node 47, hosting an orchestrator 45 of "OpenStack" type, is connected.

A second infrastructure 56 of "HPC cluster" type (HPC for High Performance Computing) comprises a network 5 to which an orchestrator node 48, hosting an orchestrator 46 of "HPC" type, is connected.

The orchestrators 45 and 46, managing respectively the resource infrastructures 55 and 56, communicate with one another via the cooperation interface 3 on which the consensus protocol runs. These orchestrators 45 and 46 therefore form the same swarm of orchestrators.

In this case, the client application will be deployed in one piece on a single infrastructure. The hosted client application will therefore be a "single-infrastructure application". The two respective instances of orchestrators 45 and 46 are connected to one another by the consensus protocol. The whole of the network therefore supports two infrastructures 55 and 56 with different characteristics. On the one hand, infrastructure 56 offers significant computing power and an internal communication network with very high speed and low latency but for a high cost of use. Conversely, infrastructure 55 offers the possibility of creating numerous virtual machines at a low cost, but with low computing power and a slower network.

In the case of a client application of "big data" type with multiple third parties and different characteristics. Indeed, a client application of "deep learning" type integrates a very large amount of data and applies mathematical models to this data which require a lot of memory and a low latency network for the exchange of this data.

Figure 12:
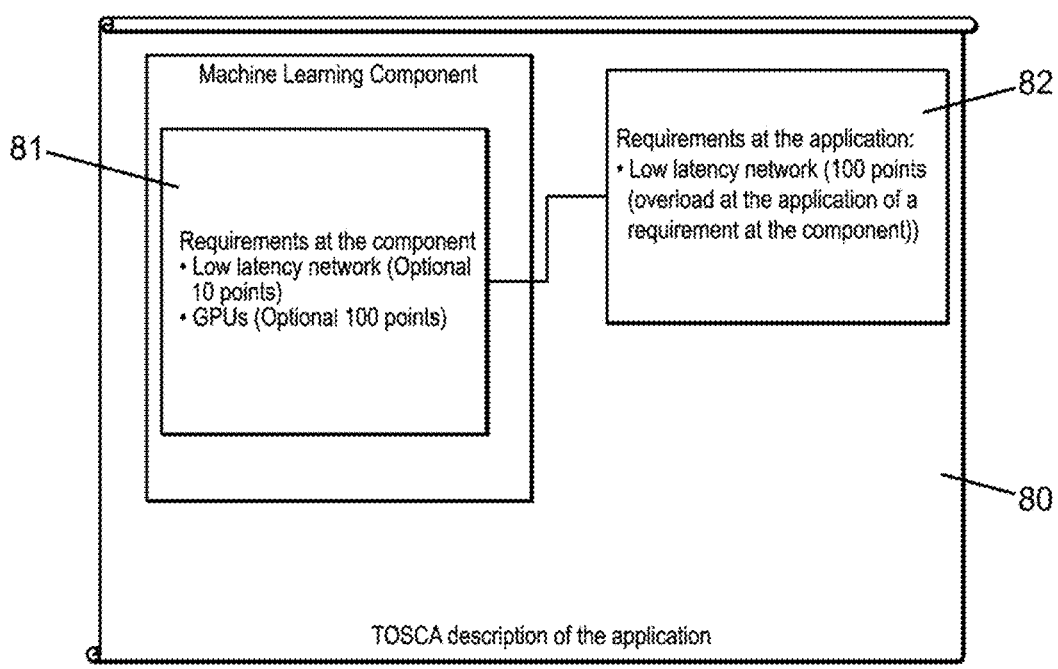
FIG. 12 schematically depicts a description in TOSCA language of the requirements of a client application which has to be hosted on the same infrastructure in a computer network according to one embodiment of the invention.

FIG. 12 schematically depicts a description in TOSCA (Topology & Orchestration Specification for Cloud Application) language of the requirements of a client application which has to be hosted on the same infrastructure in a computer network according to one embodiment of the invention.

The client application is described in TOSCA language. Each component has its life cycle implemented in this language. These components are assembled and connected to one another in the application. The characteristics of the components, such as for example their necessary computing power or else their network type, are also expressed in TOSCA language, at the component level and/or at the application level, this application level being able to overload the component level.

This description 80 comprises a description 81 of the requirements at the component level and a description 82 of the requirements at the application level.

The description 81 of the requirements at the component level specifies a low latency network, which increases the score by 10 points, and also the presence of a graphics processor, which increases the score by 100 points.

The description 82 of the requirements at the application level again specifies a low latency network, which further increases the score by 10 points: this is an example of overload at the application level of a requirement already specified at the component level.

Figure 13:
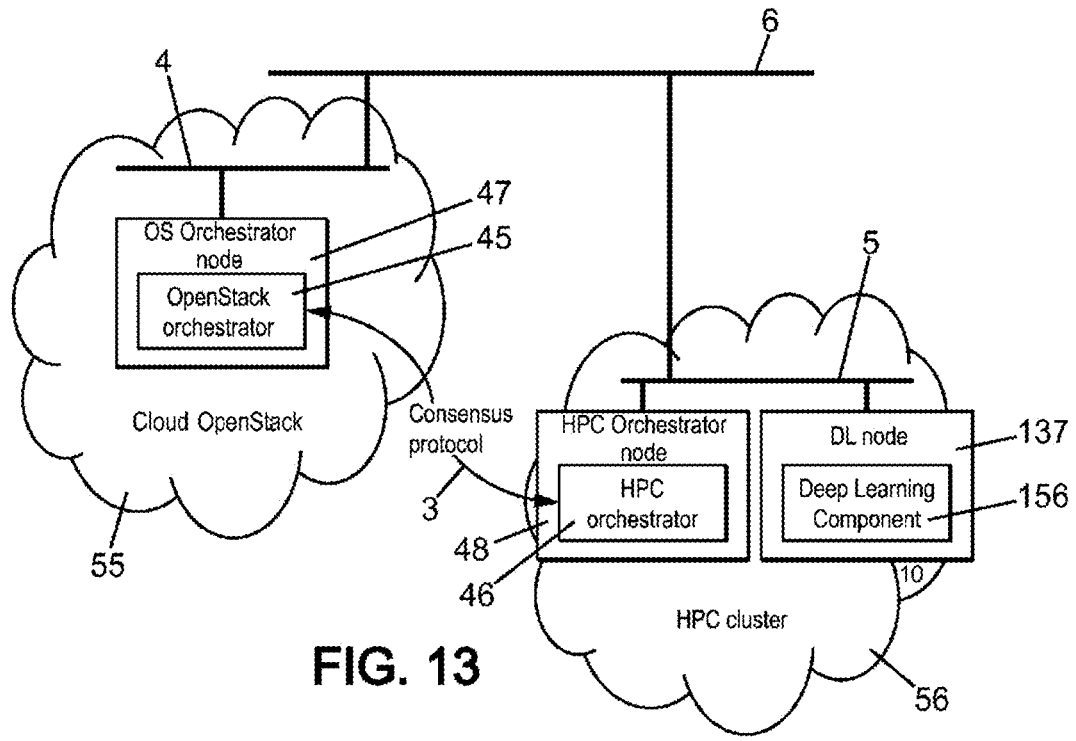
FIG. 13 schematically depicts yet another example of deployment of client applications, each hosted on the same infrastructure in a computer network according to one embodiment of the invention.

FIG. 13 schematically depicts yet another example of deployment of client applications, each hosted on the same infrastructure in a computer network according to one embodiment of the invention.

The first infrastructure 55 of "Cloud OpenStack" type and its orchestrator 45 of "OpenStack" type, and also the second infrastructure 56 of "HPC Cluster" type and its orchestrator 46 of "HPC" type are the same as in FIG. 11.

The orchestrators 45 and 46, managing respectively the resource infrastructures 55 and 56, communicate with one another via the cooperation interface 3 on which the consensus protocol runs. This consensus protocol has decided to host component 156 of the client application, the requirements of which were described in FIG. 12, at the level of node 137 connected to network 5 of the second infrastructure 56.

A request for deployment of the client application is then submitted to one of the instances of the swarm of orchestrators 45 and 46. I.e., for example, a request submitted to the instance of orchestrator 45. The instance of this orchestrator 45 acknowledges receipt of the request after having stored the model of the client application in a base distributed between the instances of the swarm of orchestrators, in order then to announce, by the consensus protocol, that a new evaluation is open for hosting this client application.

Each instance of orchestrator 45 or 46 wishing to participate in this evaluation opens a session with a short lifetime which it will have to regularly renew to prolong the lifetime thereof, as long as the consensus protocol has not announced the results of its own evaluation. If one of the orchestrators 45 or 46 is subject to a failure during its calculation, its session is invalidated at the end of its lifetime. An orchestrator can also decide not to participate in an evaluation, in particular if its resources are limited or if an operator has configured it to refuse new deployments. The evaluation ends when all the sessions for participation in this evaluation have ended. Here, the two instances of orchestrators 45 and 46 participate in this evaluation.

Each instance of orchestrator 45 or 46 runs the placement decision method as described in Table 2 in conjunction with FIG. 6 in order to ultimately announce, by the use of the consensus protocol, the harmony scores for the client application. The use of the consensus protocol makes it possible to elect the instance of orchestrator which is best suited to the deployment of the client application which has just been evaluated. Here, it is infrastructure 56 which is chosen. The instance of the elected orchestrator 46 then runs the life cycle for deployment of the components of the client application.

Figure 14:
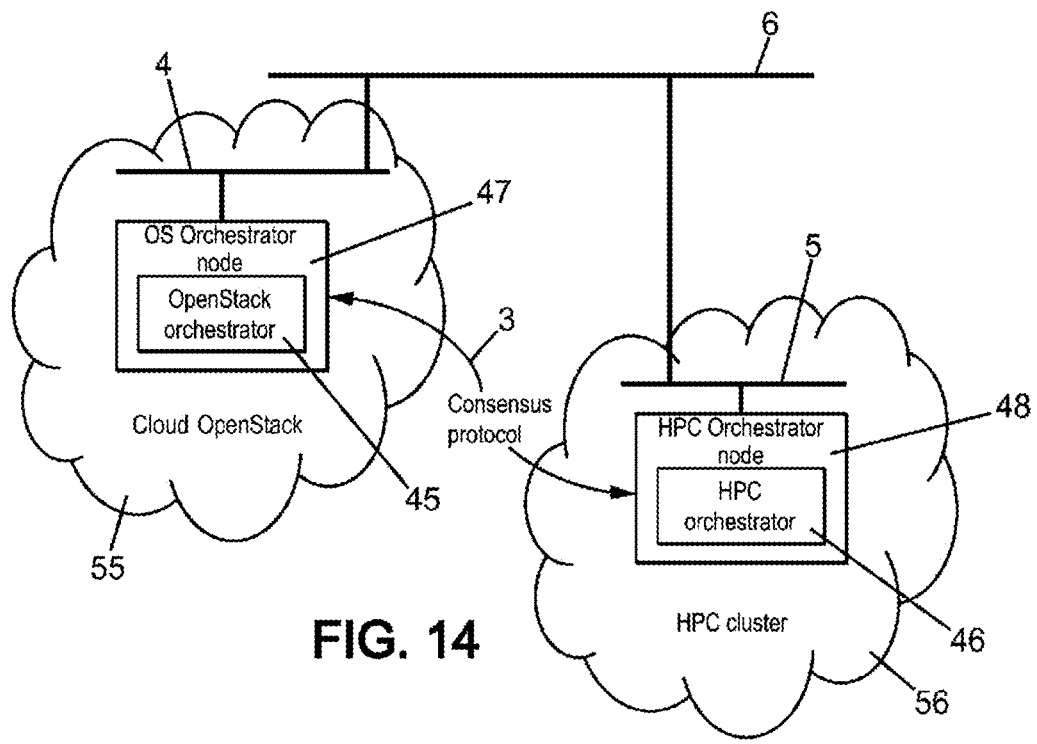
FIG. 14 schematically depicts the same example of a swarm of orchestrators as in FIG. 11, in a computer network according to one embodiment of the invention.

FIG. 14 schematically depicts the same example of a swarm of orchestrators as in FIG. 11, in a computer network according to one embodiment of the invention, but this time the consensus protocol will run not only for each client application but for each component of each client application, different components of the same client application being able to be hosted by different infrastructures.

Here, the client application will be deployed component by component on the two infrastructures 55 and 56. The hosted client application will therefore be a "hybrid application". The two respective instances of orchestrators 45 and 46 are connected to one another by the consensus protocol. The whole of the network therefore supports two infrastructures 55 and 56 with different characteristics. On the one hand, infrastructure 56 offers significant computing power and an internal communication network with very high speed and low latency but for a high cost of use. Conversely, infrastructure 55 offers the possibility of creating numerous virtual machines at a low cost but with low computing power and a slower network.

In the case of a client application of "big data" type with multiple third parties and different characteristics depending on the different components of this client application. Indeed, a component of a client application of "deep learning" type integrates a very large amount of data and applies mathematical models to this data which require a lot of memory and a low latency network for the exchange of this data. On the other hand, next, once the model has been applied to big data, the results, which have a much smaller volume, are stored in a database and a man-machine interface of web type is used to present these results. The "storage and presentation" component requires resilience, via redundancy and load distribution, but the computing power required is much smaller than the "deep learning" component.

Figure 15:
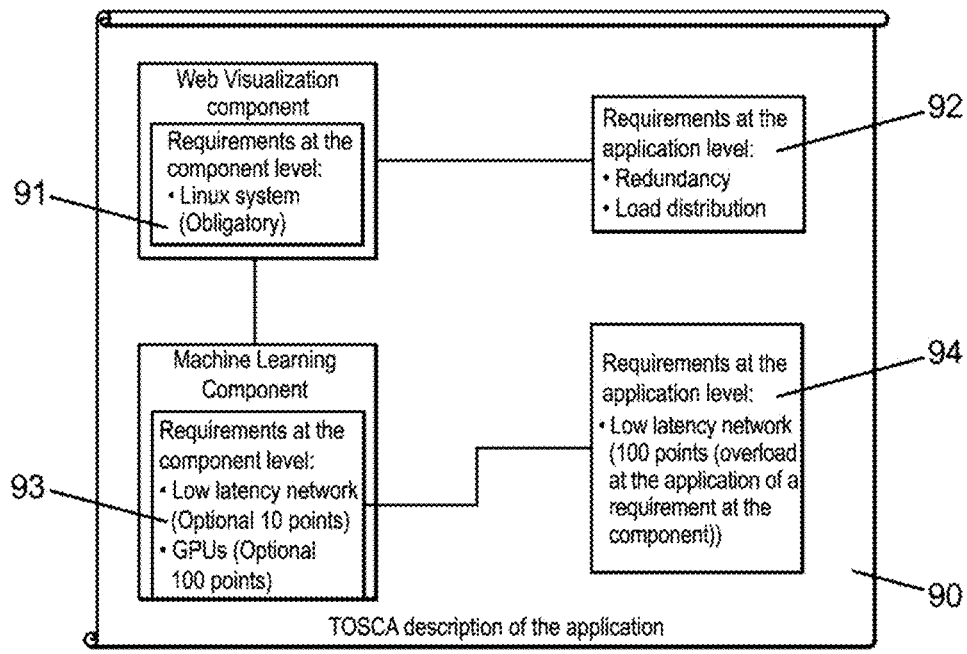
FIG. 15 schematically depicts a description in TOSCA language of the requirements of a client application which has to be hosted on multiple different infrastructures in a computer network according to one embodiment of the invention.

FIG. 15 schematically depicts a description in TOSCA language of the requirements of a client application which has to be hosted on multiple different infrastructures in a computer network according to one embodiment of the invention.

This description 90 comprises a description 91 of the requirements at the component level for a first component of a client application and a description 92 of the requirements at the client application level for this first component of this same client application, and also a description 93 of the requirements at the component level for a second component of this same client application and a description 94 of the requirements at the client application level for this second component of this same client application.

The description 91 of the requirements at the component level for a first "storage and presentation" component of a client application specifies mandatorily a system of Linux type (registered trademark), without which the score falls and stays at 0 points.

The description 92 of the requirements at the application level for this first "storage and presentation" component of this same client application specifies, optionally, redundancy, which adds 10 additional points, and load distribution, which also adds 10 additional points for the evaluation score.

The description 93 of the requirements at the component level for a second "deep learning" component of this same client application specifies a low latency network, which increases the score by 10 points, and also the presence of a graphics processor, which increases the score by 100 points.

The description 94 of the requirements at the application level for this second "deep learning" component of this same client application again specifies a low latency network, which further increases the score by 10 points: this is again an example of overload at the application level of a requirement already specified at the component level.

Figure 16:
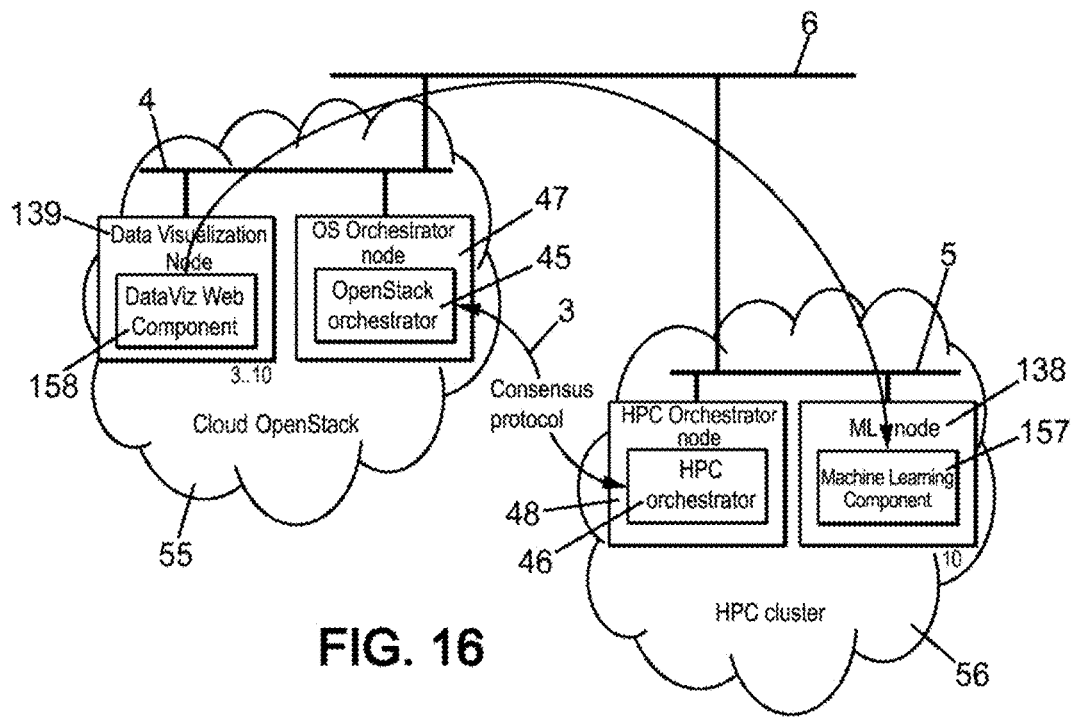
FIG. 16 schematically depicts yet another example of deployment of client applications, each hosted on multiple different infrastructures in a computer network according to one embodiment of the invention.

FIG. 16 schematically depicts yet another example of deployment of client applications, each hosted on multiple different infrastructures in a computer network according to one embodiment of the invention.

The first infrastructure 55 of "Cloud OpenStack" type and its orchestrator 45 of "OpenStack" type, and also the second infrastructure 56 of "HPC Cluster" type and its orchestrator 46 of "HPC" type are the same as in FIGS. 11, 13 and 14.

The orchestrators 45 and 46, managing respectively the resource infrastructures 55 and 56, communicate with one another via the cooperation interface 3 on which the consensus protocol runs. This consensus protocol has decided to host the first component 158 of the client application, the requirements of which were described in FIG. 15, at the level of node 139 connected to network 4 of the first infrastructure 55. This consensus protocol has on the other hand decided to host the second component 157 of the client application, the requirements of which were described in FIG. 15, at the level of node 138 connected to network 5 of the second infrastructure 56.

In the same manner as in FIG. 13, the two instances of orchestrators 45 and 46 participate in the open evaluation for this new client application.

Each instance of orchestrator 45 or 46 runs the placement decision method as described in Table 2 in conjunction with FIG. 6 in order to ultimately announce, by the use of the consensus protocol, the harmony scores for each of the components of the client application. The use of the consensus protocol makes it possible to elect the instance of orchestrator which is best suited to the deployment of each of components 157 and 158 of the client application which have just been evaluated. Here, it is infrastructure 56 which is chosen for component 157, while it is infrastructure 55 which is chosen for component 158. The instance of orchestrator 46 elected for component 157 runs the deployment life cycle of this component 157, while the instance of orchestrator 45 elected for component 158 runs the deployment life cycle of this component 158.

Each instance of orchestrator 45 or 46 then runs the deployment life cycle of component 158 or 157 for which it was elected to be responsible. The instances of orchestrators 45 and 46 notify one another of their respective state of progression and synchronize with one another in their progression, by the consensus protocol.

An example in which synchronization is critical is the case of one module connecting to another. For example, a source module of the connection needs the target module to be in the "started" state before it can itself enter its "configuration" state. The consensus protocol is here also used to notify the changes of states and trigger the transitions required at the suitable time.

Figure 16A:
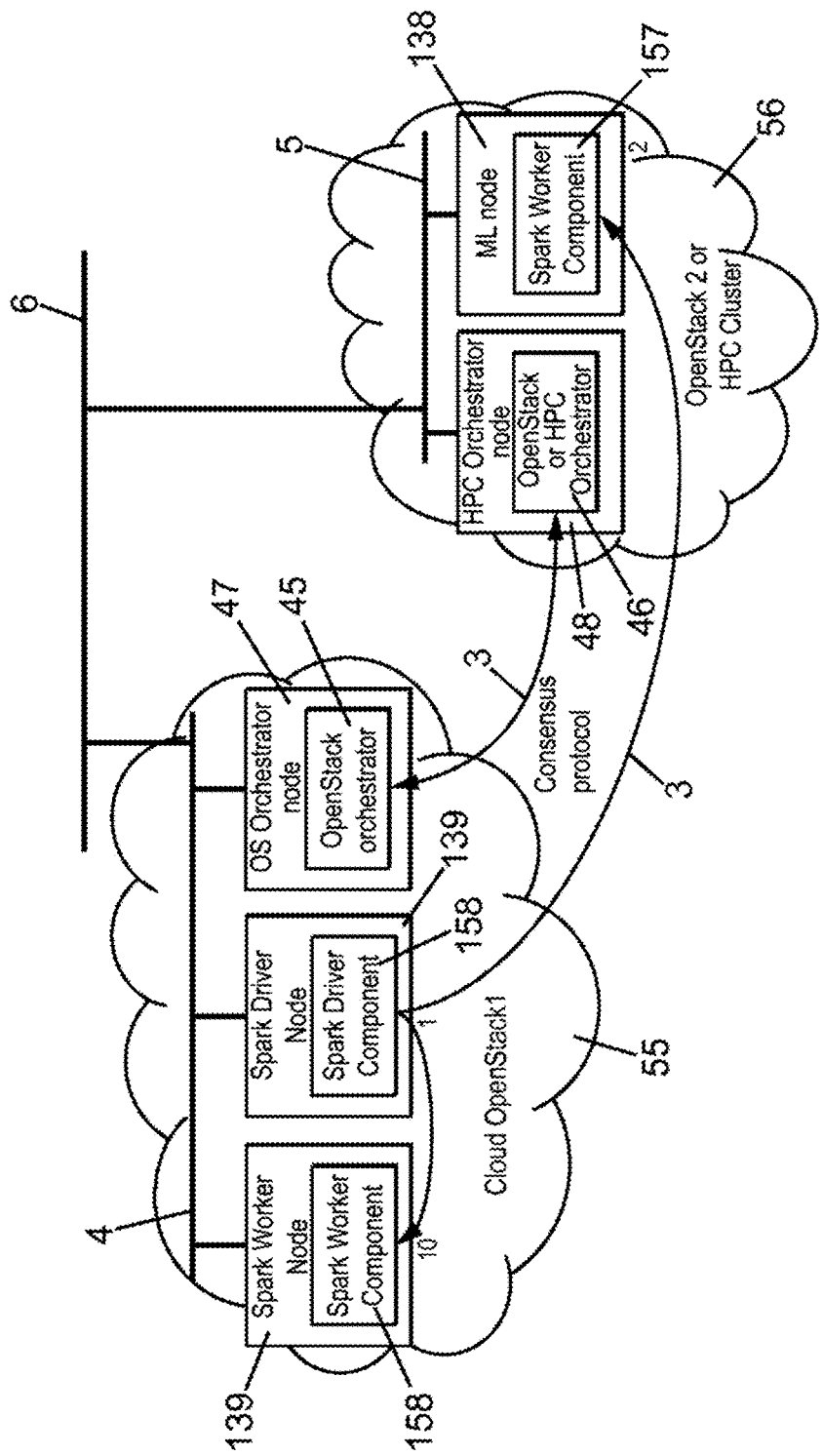
FIG. 16a schematically depicts yet another example of deployment of at least one additional component of at least one client application already hosted on multiple different infrastructures in a computer network according to one embodiment of the invention.

FIG. 16a schematically depicts yet another example of deployment of at least one additional component of at least one client application already hosted on multiple different infrastructures in a computer network according to one embodiment of the invention.

The first infrastructure 55 of "Cloud OpenStack1" type and its orchestrator 45 of "OpenStack" type, and also the second infrastructure 56 of "HPC Cluster" type or else "Cluster OpenStack2" type and its corresponding orchestrator 46 either of "HPC" type or of "OpenStack" type, are the same as in FIGS. 11, 13 and 14.

The orchestrators 45 and 46, managing respectively the resource infrastructures 55 and 56, communicate with one another via the cooperation interface 3 on which the consensus protocol runs. This consensus protocol had already decided to host the first component 158 of the client application, the requirements of which were described in FIG. 15, at the level of node 139 connected to network 4 of the first infrastructure 55. This consensus protocol had on the other hand already decided to host the second component 157 of the client application, the requirements of which were described in FIG. 15, at the level of node 138 connected to network 5 of the second infrastructure 56.

In the same manner as in FIG. 13, the two instances of orchestrators 45 and 46 participate in the open evaluation for one or more additional components 158 of this client application already distributed beforehand over infrastructures 55 and 56.

Each instance of orchestrator 45 or 46 runs the placement decision method similar to that described in Table 2 in conjunction with FIG. 6 in order to ultimately announce, by the use of the consensus protocol, the harmony scores for each of the additional components 158 of the client application. The use of the consensus protocol makes it possible to elect the instance of orchestrator which is best suited to the deployment of each of the additional components 158 of the client application which have just been evaluated. Here, it is infrastructure 55 which is chosen for all of the additional components 158, but the latter could also have been distributed between infrastructures 55 and 56. The instance of orchestrator 45 elected for the additional components 158 runs the deployment life cycle of these additional components 158.

The instance of orchestrator 45 then runs the deployment life cycle of the additional components 158 for which it was elected to be responsible.

Figure 17:
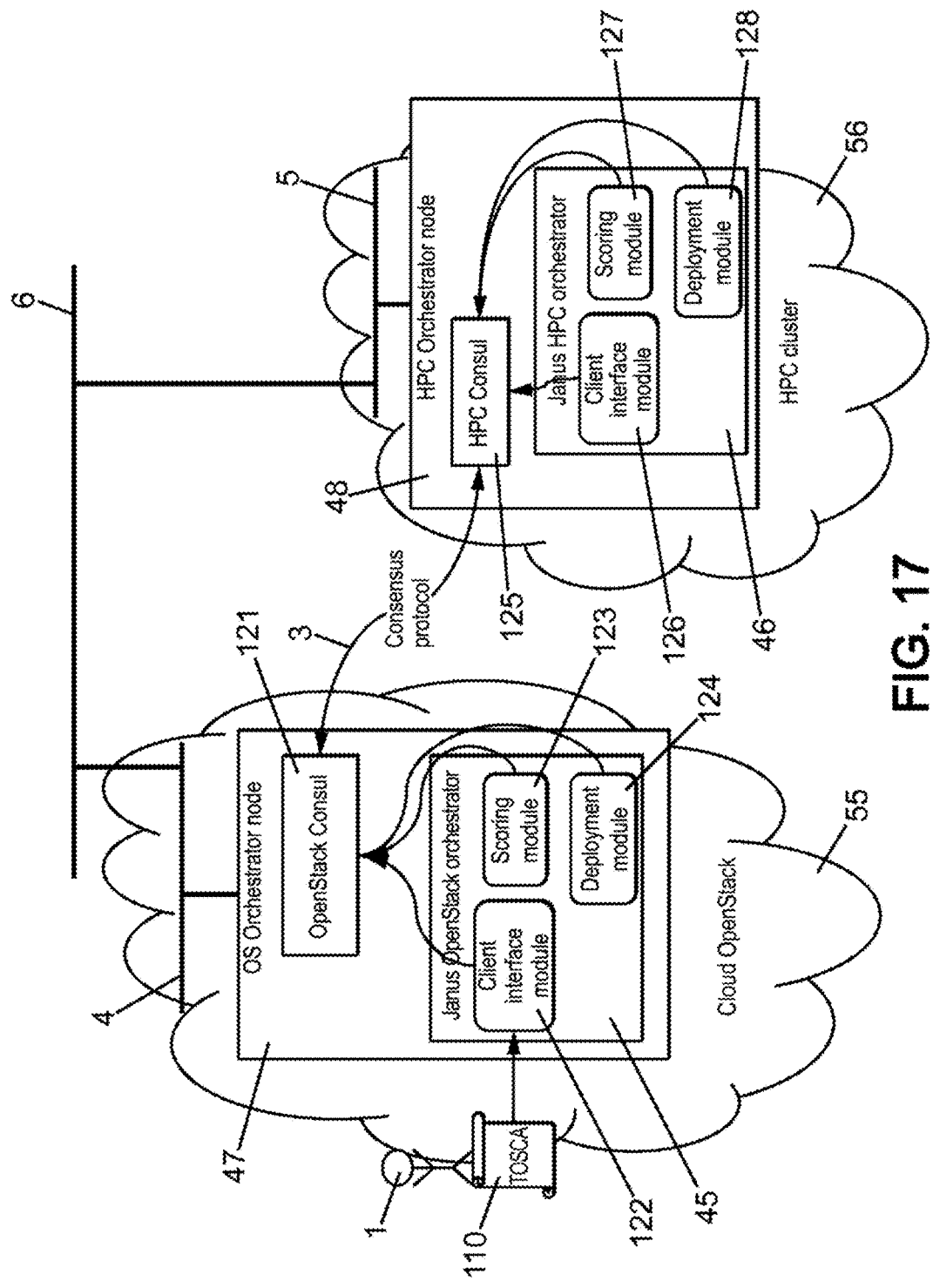
FIG. 17 schematically depicts an example of the structure of the orchestrators in the example of a swarm of orchestrators of FIGS. 11 and 14, in a computer network according to one embodiment of the invention.

FIG. 17 schematically depicts an example of the structure of the orchestrators in the example of a swarm of orchestrators of FIGS. 11 and 14, in a computer network according to one embodiment of the invention.

A first infrastructure 55 of "Cloud OpenStack" type comprises a network 4 to which an orchestrator node 47, hosting an orchestrator 45 of "OpenStack" type, is connected.

The orchestrator 45 comprises a client interface module 122 responsible for recovering the description 110, in TOSCA language, of the client application from the operator 1, a score evaluation module 123 responsible for recovering the metadata of the client application and sending the corresponding store, for the client application component in question or for the client application in question, a module for deployment 124 of the client application or of one of its components responsible for reading the metadata of the client application and the other information for deployment of this client application. These three modules 122 to 124 communicate, with one another and toward the outside of orchestrator 45, via an input/output module 121 of this orchestrator 45 located on node 47 and able to communicate with the other orchestrators of the swarm on the cooperation interface 3.

A second infrastructure 56 of "HPC cluster" type (HPC for High Performance Computing) comprises a network 5 to which an orchestrator node 48, hosting an orchestrator 46 of "HPC" type, is connected.

The orchestrator 46 comprises a client interface module 126 responsible for also being able, where appropriate, to recover a description, in TOSCA language, of the client application from an operator, a score evaluation module 127 responsible for recovering the metadata of the client application and sending the corresponding store, for the client application component in question or for the client application in question, a module for deployment 128 of the client application or of one of its components responsible for reading the metadata of the client application and the other information for deployment of this client application. These three modules 126 to 128 communicate, with one another and toward the outside of orchestrator 46, via an input/output module 125 of this orchestrator 46 located on node 48 and able to communicate with the other orchestrators of the swarm on the cooperation interface 3.

The orchestrators 45 and 46, managing respectively the resource infrastructures 55 and 56, communicate with one another via the cooperation interface 3 on which the consensus protocol runs.

Naturally, this invention is not limited to the examples and embodiments described and shown, but rather is subject to numerous variations accessible to the person skilled in the art.

The invention claimed is:

1. A computer network comprising a group of multiple computing resource infrastructures (51 to 56), among which:
   each infrastructure (51 to 56) comprises multiple computing resources discrete from one another but managed by the same resource manager;
   each infrastructure (51 to 56) is associated with an orchestrator (41 to 46) which is responsible for allocating the resources of this infrastructure (51 to 56) to one or more client applications (17); and
   said orchestrators (41 to 46) are grouped together in a swarm in which:
      said orchestrators (41 to 46) are interconnected by a cooperation interface (3);
      the allocation of resources from one or the other of the infrastructures (51 to 56) of the group to an additional component of a client application (17) already hosted by at least one of the infrastructures (51 to 56) of said group following a first operation of initialization of this client application (17), to host said additional component of this client application (17) during a second operation of updating this client application (17), is decided by a decision method based on:
         firstly, evaluations of likelihoods of satisfying the requirements of said additional component of this client application (17), respectively distributed in the orchestrators (41 to 46) of this swarm;
      then a consensus protocol between the orchestrators (41 to 46) of the swarm, which:
         is based on said evaluations;
         is implemented at the cooperation interface (3); and
         selects one of the infrastructures (51 to 56) of the group to host said additional component of the client application (17).

2. The computer network according to claim 1, characterized in that:
   said additional component of this client application (17) is a new component not yet hosted by one or the other of the infrastructures (51 to 56) of said group.

3. The computer network according to claim 1, characterized in that:
   said additional component of this client application (17) is the replication of an existing component already hosted by one or the other of the infrastructures (51 to 56) of said group.

4. The computer network according to claim 1, characterized in that:
   in said group, only the orchestrators (41 to 46) associated with infrastructures (51 to 56) already hosting at least one component of this client application (17) following said first operation of initialization of this client application (17) can participate in said decision method during said second operation of updating this client application (17).

5. The computer network according to claim 1, characterized in that said decision method comprises the following successive steps:
   a first step of requesting deployment of said additional component of this client application (17) from one of the orchestrators (41 to 46) of the swarm;
   a second step of transmitting the requirements of all or part of said additional component of said client application (17) to all the orchestrators (41 to 46) of the swarm, on their cooperation interface (3);
   a third step of notifying the participation or non-participation in the evaluations by the orchestrators (41 to 46) of the swarm, on their cooperation interface (3);
   a fourth step of carrying out the evaluation by calculating a score for said additional component of said client application (17) by each of the orchestrators (41 to 46) participating in the evaluations;
   a fifth step of agreeing, by the consensus protocol, on the selection of that one of the infrastructures (51 to 56) of the group, for hosting said additional component of said client application (17), which achieved the best score; and
   a sixth step of deploying said additional component of said application (17) on the selected infrastructure (51 to 56).

6. The computer network according to claim 1, characterized in that said additional component (21 to 28) of the client application is allocated to a single infrastructure (51 to 56), said additional component (21 to 28) of the client application (17) being a unit for deployment of this application (17) on one of the infrastructures (51 to 56) of the group, one component preferably being a physical machine or a virtual machine or a container.

7. The computer network according to claim 6, characterized in that said deployment step comprises the following phases:
   a first phase of launching the deployment of said additional component, after the deployments of multiple discrete components (21 to 28) of the same client application (17), implemented beforehand in parallel on multiple different infrastructures (51 to 56) selected from the same group;

a second phase of updating the relationships between the different components (21 to 28) of this same client application (17) hosted on the different infrastructures (51 to 56) of this same group, including said additional component;

a third phase of requesting a report of the deployments, by an operator (1, 2) of the client application (17), from one of the orchestrators (41 to 46) of the swarm;

a fourth phase of accessing the state of the deployments, via the cooperation interface (3), by this orchestrator (41 to 46); and a fifth phase of sending a report of the state of the deployments, by this orchestrator (41 to 46), to the operator (1, 2) of the client application (17).

8. The computer network according to claim 7, characterized in that several of said, preferably all of the, infrastructures (51 to 56) of the same group being able to host the different components (21 to 28) of the same client application (17) are heterogeneous to one another.

9. The computer network according to claim 6, characterized in that said score calculation for said additional component (21 to 28) of a client application (17) also integrates the score of the other components (21 to 28) of the same client application (17) so as to favor locating the different components (21 to 28) of the same client application (17) on the same infrastructure (51 to 56).

10. The computer network according to claim 6, characterized in that each orchestrator (41 to 46) of the same group embeds its own score calculation logic to carry out an evaluation, integrating equally the specificity of the type of associated infrastructure and its context of use.

11. The computer network according to claim 1, characterized in that an operator (1, 2) of the client application (17) contacts any one of the orchestrators (41 to 46) of the swarm to request the hosting of said additional component of said application (17).

12. The computer network according to claim 1, characterized in that, after receipt by an orchestrator (41 to 46) of a request for hosting a client application (17), this orchestrator (41 to 46) transmits all or part of the metadata (14) of said additional component of this client application (17) to the other orchestrators (41 to 46) of the swarm for their respective evaluations.

13. The computer network according to claim 1, characterized in that, in order to carry out its evaluation of its likelihoods to satisfy the requirements of said additional component of this client application (17), each orchestrator (41 to 46) of the swarm opens a session of predetermined duration, optionally renewable before the session end, the end of all the sessions of the orchestrators of the swarm triggering said consensus protocol.

14. The computer network according to claim 1, characterized in that each orchestrator (41 to 46) of the swarm has its own mode of evaluating its likelihoods to satisfy the requirements of said additional component of this client application (17), this mode of evaluation being modifiable by each orchestrator (41 to 46) of the swarm via a branch of an evaluation logic module.

15. The computer network according to claim 1, characterized in that an orchestrator (41 to 46) can decide to abort an ongoing evaluation for said additional component of this client application (17), if this client application (17) has a particular profile unsuited to the infrastructure (51 to 56) of this orchestrator (41 to 46).

16. The computer network according to claim 1, characterized in that each orchestrator (41 to 46) of the swarm refuses to participate in the evaluations if its resources are too limited or if it has been configured to refuse new application deployments.

17. The computer network according to claim 1, characterized in that a new orchestrator (41 to 46) communicates its types of resources and its capacities on its cooperation interface (3) to the other orchestrators (41 to 46) of a swarm in order to be integrated in their swarm.

18. The computer network according to claim 1, characterized in that the client applications (17) describe, in the TOSCA model, their requirements to the orchestrator (41 to 46) that they are contacting.

19. The computer network according to claim 1, characterized in that at least one, preferably multiple, even more preferably all, of the orchestrators (41 to 46) of the swarm each include:

a input/output module (121, 125) for communicating with the other orchestrators (41 to 46) of the swarm on the cooperation interface (3), a client interface module (122, 126) for communicating with the operators (1, 2) of the client applications (17), a score calculation module (123, 127) for calculating a score for all or part of the client application (17), the requirements of which are communicated to it, a deployment module (124, 128) for deploying a client application (17) on the infrastructure (51 to 56) associated with said orchestrator (41 to 46), wherein the client interface module (122, 126), score calculation module (123, 127) and deployment module (124, 128) of an application (17) all communicate with the input/output module (121, 125).

20. A decision method for allocating computing resources from one or the other of the computing resource infrastructures (51 to 56) of the same group of infrastructures (51 to 56) of a computer network, to an additional component of a client application (17) already hosted by at least one of the infrastructures (51 to 56) of said group following a first operation of initialization of this client application (17), to host said additional component of this client application (17) during a second operation of updating this client application (17), based on:

first, evaluations distributed in the respective orchestrators (41 to 46) of said infrastructures (51 to 56), of the likelihoods of satisfying the requirements of said additional component of said client application (17); and then a consensus protocol between said orchestrators (41 to 46), which:

is based on said evaluations;

is implemented at a cooperation interface (3) connecting to one another said orchestrators (41 to 46) of the same swarm associated with said group of infrastructures (51 to 56); and selects one of said infrastructures (51 to 56) of said group to host said additional component of said client application (17), by allocating it all or part of the resources of the selected infrastructure (51 to 56).

* * * * *